US011568370B2

(12) United States Patent
Raje et al.

(10) Patent No.: US 11,568,370 B2
(45) Date of Patent: Jan. 31, 2023

(54) METHODS AND SYSTEMS FOR ASSOCIATING A TEAM WITH A MEETING

(71) Applicant: RingCentral, Inc., Belmont, CA (US)

(72) Inventors: Prasad Raje, San Jose, CA (US); John Wang, Belmont, CA (US); Michael Machado, Santa Clara, CA (US)

(73) Assignee: RingCentral, Inc., Belmont, CA (US)

( * ) Notice: Subject to any disclaimer, the term of this patent is extended or adjusted under 35 U.S.C. 154(b) by 106 days.

(21) Appl. No.: 17/139,550

(22) Filed: Dec. 31, 2020

(65) Prior Publication Data

US 2022/0207488 A1    Jun. 30, 2022

(51) Int. Cl.
*G06Q 10/10* (2012.01)
*G06Q 10/06* (2012.01)

(52) U.S. Cl.
CPC ......... *G06Q 10/1095* (2013.01); *G06Q 10/06* (2013.01); *G06Q 10/06311* (2013.01); *G06Q 10/063112* (2013.01); *G06Q 10/063118* (2013.01); *G06Q 10/107* (2013.01)

(58) Field of Classification Search
CPC ......... G06Q 10/1095; G06Q 10/06311; G06Q 10/063112; G06Q 10/063118; G06Q 10/06
See application file for complete search history.

(56) References Cited

U.S. PATENT DOCUMENTS

| 10,135,989 | B1 | | 11/2018 | Indyk et al. | |
|---|---|---|---|---|---|
| 10,489,430 | B1 | * | 11/2019 | Rogynskyy | G06F 16/1734 |
| 11,328,368 | B1 | * | 5/2022 | Labrie | G06Q 10/1095 |
| 2008/0313000 | A1 | * | 12/2008 | Degeratu | G06Q 10/105 |
| | | | | | 705/320 |
| 2009/0006161 | A1 | * | 1/2009 | Chen | G06Q 10/1095 |
| | | | | | 705/7.19 |

(Continued)

FOREIGN PATENT DOCUMENTS

EP    2381402    10/2011

OTHER PUBLICATIONS

"What is Meet Now and how do I use it in Skype" https://support.skype.com/en/faq/fa34926/what-is-meet-now-and-how-do-i-use-it-in-skype, retrieved on Dec. 30, 2020.

*Primary Examiner* — Rutao Wu
*Assistant Examiner* — Sarjit S Bains
(74) *Attorney, Agent, or Firm* — Finnegan, Henderson, Farabow, Garrett & Dunner, LLP

(57) ABSTRACT

A method for associating a team with a meeting for prospective meeting includes receiving a meeting invitation comprising first information, wherein the first information comprises data identifying the prospective meeting attendees, receiving second information for a plurality of teams, wherein the second information comprises data identifying members for each one of the plurality of teams, comparing the first information with the second information to determine a match metric for each one of the plurality of teams, and determining a matching team from the plurality of teams for which the match metric is above a match threshold value. The method further includes, in response to determining that the match metric is below the match threshold value computed for each one of the plurality of teams, creating a new team, and associating one of the matching team or the new team with the meeting for prospective meeting attendees.

21 Claims, 15 Drawing Sheets

(56) References Cited

U.S. PATENT DOCUMENTS

| | | | |
|---|---|---|---|
| 2009/0210351 A1* | 8/2009 | Bush | G06Q 50/188 |
| | | | 705/80 |
| 2011/0263278 A1* | 10/2011 | Riddle | H04L 51/216 |
| | | | 455/466 |
| 2013/0212494 A1* | 8/2013 | Heiferman | H04L 51/00 |
| | | | 715/753 |
| 2013/0219298 A9* | 8/2013 | Whalin | H04W 4/021 |
| | | | 715/753 |
| 2013/0254279 A1* | 9/2013 | Bentley | G06F 16/9535 |
| | | | 709/204 |
| 2014/0337279 A1* | 11/2014 | Mo | G06Q 10/103 |
| | | | 707/608 |
| 2015/0019273 A1* | 1/2015 | Grosz | G06Q 50/01 |
| | | | 705/5 |
| 2015/0095087 A1* | 4/2015 | Adderly | G06Q 10/1095 |
| | | | 705/7.19 |
| 2017/0093967 A1* | 3/2017 | Grosz | H04L 51/32 |
| 2018/0174105 A1* | 6/2018 | Kenthapadi | G06F 16/24578 |
| 2019/0116210 A1* | 4/2019 | Keen | H04L 51/32 |
| 2019/0333025 A1* | 10/2019 | Adamson | G06Q 10/063116 |
| 2019/0363945 A1* | 11/2019 | Rogynskyy | G06F 16/9035 |
| 2021/0105147 A1* | 4/2021 | Waugh | H04L 67/306 |

* cited by examiner

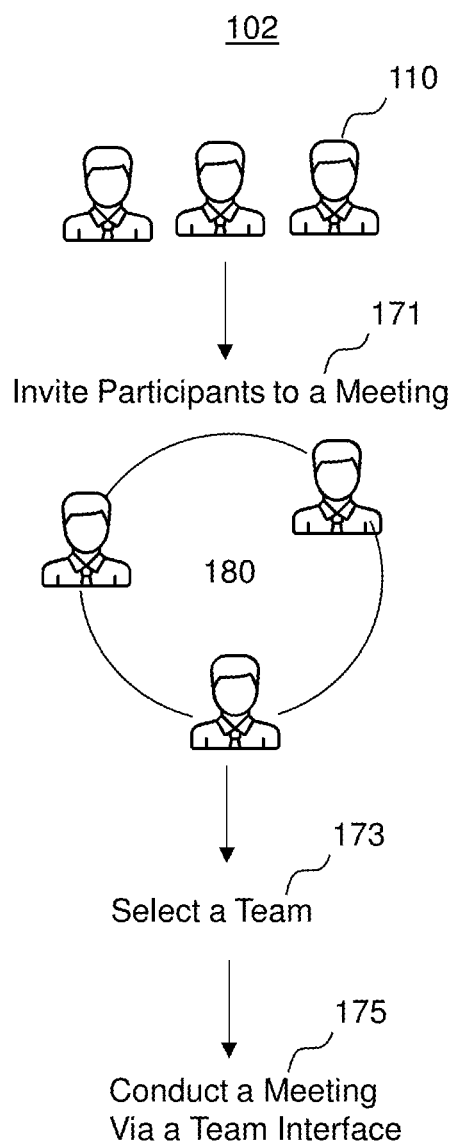

| Meeting Participants 110 | Team Members 310 | Match Condition and Match Metric | Action |
|---|---|---|---|
| A, B, C | A, B, C | Exact Match (M1) | Associate the Matching Team |
| A, B, C | A, B, C, D, E, F, G | Subset Match (M2) | Associate the Matching Team |
| A, B, C | A, B, D, E, F | Partial Match (M3) | Associate the Matching Team, Offer to Add C |
| D, E, F, G | None | No Match (M4) | Offer To Create Team |
| A, B, C, X | A, B, C, X – no account | Partial Match With Guest (M5) | Associate the Matching Team, Invite Guest |
| A, B, C | A, B, C, D, E, F | Subset Match (M2) | Associate the Matching Team, Offer to Add D, E, F to Participants 110 |

FIG. 6A

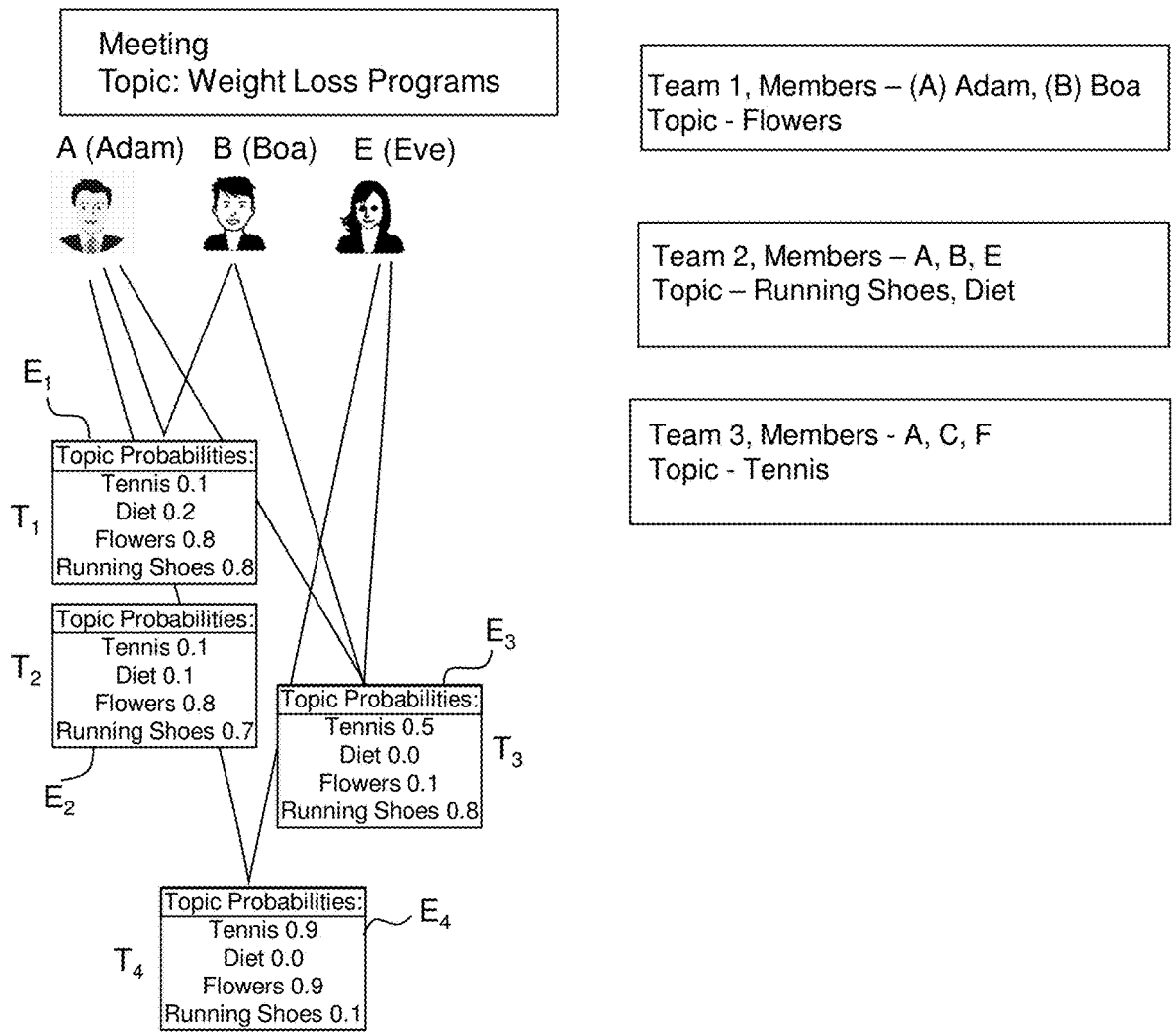

Probability for Tennis: $P_T = \sum w_i(T_i) \cdot TP_i(Tennis)$

Probability Running Shoes: $P_R = \sum w_i(T_i) \cdot TP_i(Running\ Shoes)$

Probability Flowers: $P_F = \sum w_i(T_i) \cdot TP_i(Flowers)$

Probability for Diet: $P_D = \sum w_i(T_i) \cdot TP_i(Diet)$ $P_{WT} = P(Weight\ Loss\ Programs\ |\ Tennis)$
$P_{WD} = P(Weight\ Loss\ Programs\ |\ Diet)$
$P_{WF} = P(Weight\ Loss\ Programs\ |\ Flowers)$
$P_{WR} = P(Weight\ Loss\ Programs\ |\ Running\ Shoes)$ Probability: $P_A(Tennis) = P_{WT} \cdot P_T$, $P_A(Diet) = P_{WD} \cdot P_D$, $P_A(Flowers) = P_{WF} \cdot P_F$, $P_A(Running\ Shoes) = P_{WR} \cdot P_R$,

METHODS AND SYSTEMS FOR ASSOCIATING A TEAM WITH A MEETING

TECHNICAL FIELD

The present disclosure generally relates to systems and methods for managing communication and messages for meetings, and more particularly, for creating or associating collaboration groups for prospective attendees of the meetings.

BACKGROUND

Team collaboration via various software applications has become increasingly popular over the years. This rise in popularity may be due, at least in part, to the fact that many project team members may be working from multiple remote locations. As such, the need may arise for diverse teams to efficiently communicate with each other while completing a project.

Technology has been developed to address the needs of team collaboration. For example, some collaboration systems have been created that allow users to collaborate on single documents or shared folders across a broad geographical region. Modern collaboration systems may be configured to enable users to exchange text messages, images, audio, video, as well as data files. Further, modern collaboration systems may allow for the creation of collaboration groups, also referred to as teams. A team may be created for a given project, with discussions related to the project confined to data communications between the collaborators of the team. Besides using teams, collaboration frequently involves scheduling a meeting between some of the collaborators using various calendar-related applications, such as Outlook, Gmail, or other similar applications. The information available for scheduled meetings using calendar-related applications may need to be associated with a particular team for streamlining communication between the prospective meeting attendees. Such association may present challenges, as there can be multiple teams that can be selected to be associated with a particular scheduled meeting. Alternatively, a new team may need to be created if none of the existing teams can be determined to match the scheduled meeting.

The disclosed systems and methods for associating a team with a meeting address one or more of the challenges set forth above and/or other problems in the prior art.

SUMMARY

Consistent with a disclosed embodiment, a method for associating a team with a meeting for prospective meeting attendees is provided. The method includes receiving a meeting invitation comprising first information, wherein the first information comprises data identifying the prospective meeting attendees, receiving second information for a plurality of teams, wherein the second information comprises data identifying members for each one of the plurality of teams, comparing the first information with the second information to determine a match metric for each one of the plurality of teams, and determining a matching team from the plurality of teams for which the match metric is above a match threshold value. The method further includes, in response to determining that the match metric is below the match threshold value computed for each one of the plurality of teams, creating a new team, and associating one of the matching team or the new team with the meeting for prospective meeting attendees.

Consistent with another disclosed embodiment, a browser plugin for transmitting data between a team system and an electronic communication system is provided. The browser plugin includes instructions, such that when executed by a processor result in the processor performing operations. The operations include receiving a meeting invitation comprising first information, wherein the first information comprises data identifying the prospective meeting attendees, receiving second information for a plurality of teams, wherein the second information comprises data identifying members for each one of the plurality of teams, and comparing the first information with the second information to determine a match metric for each one of the plurality of teams. The operations further include determining a matching team from the plurality of teams for which the match metric is above a match threshold value, in response to determining that the match metric is below the match threshold value computed for each one of the plurality of teams, creating a new team, and associating one of the matching team or the new team with the meeting for prospective meeting attendees.

Consistent with other disclosed embodiments, non-transitory computer readable storage media may store program instructions, which are executed by at least one processor and perform any of the methods described herein.

Additional features and advantages of the disclosed embodiments will be set forth in part in the following description and will be apparent from the description or may be learned by practice of the embodiments. The features and advantages of the disclosed embodiments may be realized and attained by the elements and combinations set forth in the claims.

It is to be understood that the foregoing general description and the following detailed description are exemplary and explanatory only and are not restrictive of the disclosure, as claimed.

BRIEF DESCRIPTION OF THE DRAWINGS

Embodiments and various aspects of the present disclosure are illustrated in the following detailed description and the accompanying figures. Various features shown in the figures are not drawn to scale.

FIG. 1B shows an example process for selecting a team and conducting a meeting, consistent with disclosed embodiments.

FIG. 4 shows example match conditions between prospective meeting attendees of a meeting and members of a team, consistent with disclosed embodiments.

FIG. 6A shows an example process for determining a probability for a team to match a meeting, consistent with disclosed embodiments.

DETAILED DESCRIPTION

Figure 1A:
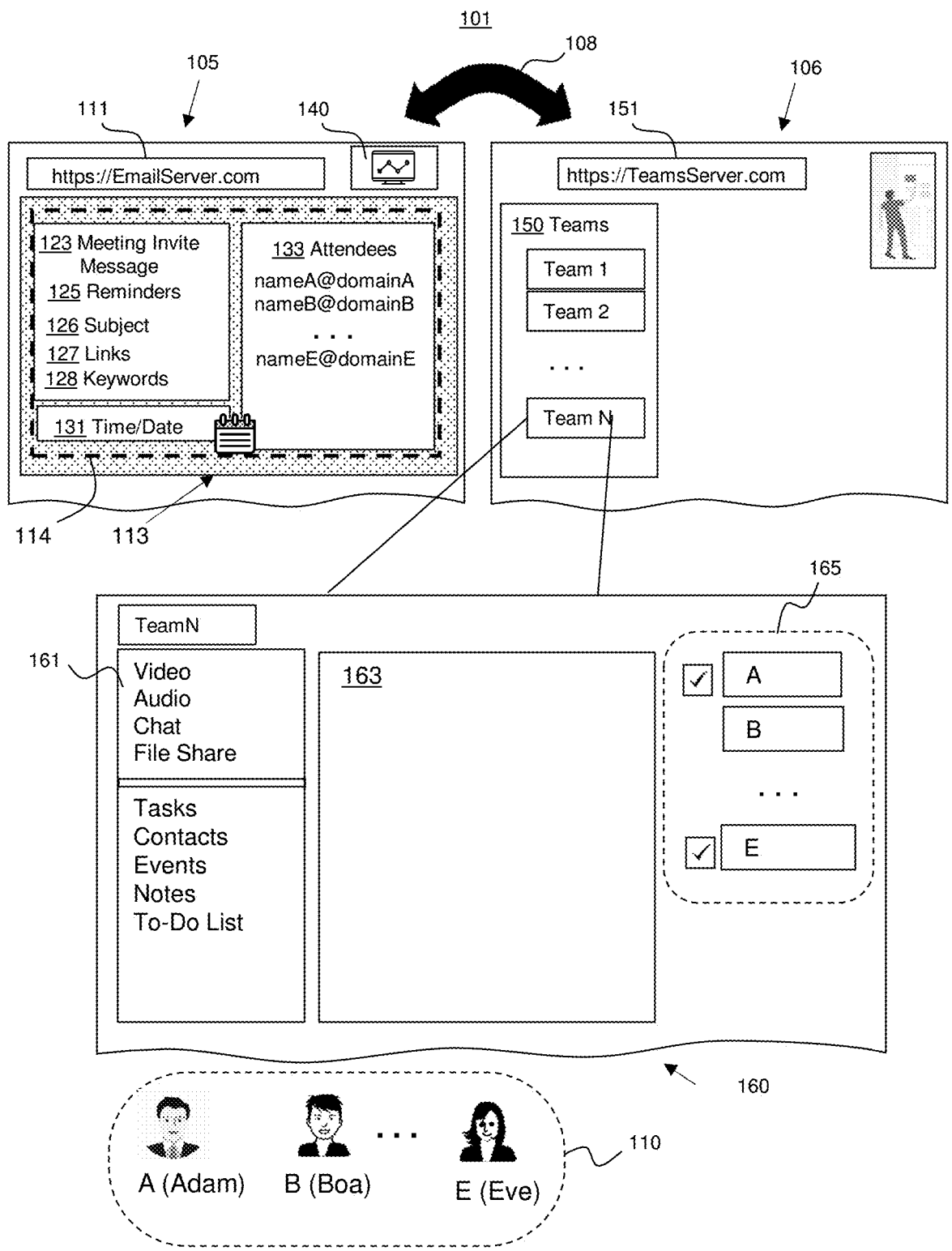
FIG. 1A shows an example embodiment of a system for managing communication, consistent with disclosed embodiments.

Reference will now be made in detail to example embodiments, including those illustrated in the accompanying drawings. The following description refers to the accompanying drawings in which the same numbers in different drawings represent the same or similar elements unless otherwise represented. The implementations set forth in the following description of the embodiments do not represent all possible implementations consistent with the invention. Instead, they are merely examples of systems and methods consistent with aspects related to the invention as recited in the appended claims. Particular aspects of the present disclosure are described in greater detail below.

Embodiments of the present disclosure relate to systems and methods for managing communications between prospective meeting attendees (e.g., the prospective meeting attendees are individuals invited to a particular meeting such as a phone meeting, internet-based conference, and the like). The systems may comprise any suitable computer software application for analyzing communication data between the prospective meeting attendees. In an example embodiment, the system may be configured to analyze data of an electronic communication system such as an email system (e.g., Outlook, Gmail, Yahoo Mail, and the like), an SMS message system, a voicemail message system, and the like, as well as to analyze data related to a real-time collaboration application (herein, also referred to as a team system or team service). The real-time collaboration application (e.g., Glip, Joste, Slack, 3CX, Range, Monday.com, and the like) may be any suitable application that allows users to exchange one or more of text messages, audio data, data files, presentations, screenshots, whiteboards, and video data (herein, any data that can be communicated, as described above, is referred to as communication data) in real-time.

In an example embodiment, real-time collaboration applications allow users to form collaboration groups (herein, also referred to as teams) for discussing a particular project or topic (herein, the term "topic" may be used interchangeably with the term "subject"). A collaboration application or, in other words, a team system may have an interface that allows a member of a team to log in to a team dashboard (e.g., a dashboard is a type of a graphical user interface that provides at-a-glance views of key functionalities of the team relevant to communications of the team). In an example embodiment, the team dashboard may be accessible by a web browser and may be periodically updated with new data. The team dashboard is configured to allow a member of a team to select one or more members for transmitting (herein, the terms "transmitting," "exchanging," or "communicating" may be used interchangeably) any suitable communication data. In various embodiments, a team may have associated memory storage for storing various communication data between the members of the team. The team system may allow a member to review previous communication data organized by the team system using any suitable approach. For example, the team system may organize the communicated data based on a time at which the data is communicated, based on a topic of the communicated data, based on keywords detected within the communicated data, based on the importance of the communicated data, based on data files communicated, based on a size of data files, based on recipients of the communicated data, or based on any other suitable parameters identified within the communicated data.

FIG. 1A shows an example embodiment of a system 101 for managing communications between prospective meeting attendees A-E (also referred to as prospective meeting attendees 110). More particularly, FIG. 1A shows system 101 for associating a team with a meeting. Herein, the phrase "associating a team with a meeting" relates to identifying an already existing team that may be used for exchanging data related to a meeting. In an example embodiment, associating a team with the meeting may include providing prospective meeting attendees 110 with a link to a web page for interfacing with the team.

In an example embodiment, system 101 uses a data link module 140 for exchanging data between an electronic communication system 105 (herein, for brevity, the electronic communication system 105 is referred to as email system 105 with the understanding that any other suitable electronic communication system may be used) and a team system 106.

Email system 105 includes an online interface (e.g., an online interface for Outlook or Gmail) accessible via an identifier such as an internet address 111, as shown in FIG. 1A. Internet address 111 is not intended to be limiting, and any other identifier may be used. Alternatively, email system 105 may be a stand-alone application, an application for a smartphone, or any other suitable application (e.g., an application for an artificial intelligence assistant, such as Alexa). Email system 105 includes one or more interfaces for prospective meeting attendees of system 101. In an example embodiment, one of the interfaces includes a list of previous electronic communications organized in any suitable way (e.g., sorted by subject, sender, receiver, size, attachments, importance, flags for different emails, and the like). Email system 105 is also configured to include a meeting interface 113 for scheduling meetings and setting meeting reminders. Meeting interface 113 may include a meeting invitation message 123 (e.g., a message describing the subject of the meeting and/or any other meeting related information), reminders 125 (e.g., alarms for an attendee, email reminders, smartphone reminders, and the like, to ensure that the attendee does not forget about the meeting), a subject field 126, links to internet websites 127, and possibly a set of keywords 128 related to the meeting. Herein, data within meeting interface 113 is referred to as a meeting invitation 114, as shown in FIG. 1A. In an example embodiment, associating a team with a meeting may include providing a link to a web page for interfacing with the team (herein, the web page for interfacing with the team may be referred to as an interface for the team) as a part of meeting invitation 114. In various embodiments, all data within interface 113 may be part of meeting invitation 114.

Interface 113 may include a list of attendees 133 listing prospective meeting attendees 110 and/or their email addresses, such as nameA@domainA through nameE@domainE or other suitable handles for communicating with such prospective meeting attendees (e.g., the handles may be user identifications for system 105, avatars, meeting identifications (IDs), video links, and the like).

As described above, system 101 includes data link module 140 for communicating data between email system 105 and team system 106. System 106 may be accessible via a website having an identifier, such as an internet address 151 (or any other identifier). In an example embodiment, team system 106 may have an interface for a user listing all teams 150 that a user may belong to (e.g., Team 1-Team N, as shown in FIG. 1A). For each team (e.g., Team N), system 106 presents an interface 160 for allowing a user to communicate with other users of the team in either a real-time or via electronic messages. In an example embodiment, interface 160 may allow a user to select a type of communication from a panel 161. For example, the user (i.e., a member of Team N) may communicate via video, image data, audio, chat, or sharing files. Additionally, interface 160 may allow a member of Team N to schedule tasks, create and organize contacts, set up reminders for events, make notes (which may include file attachments), create to-do lists, and the like. Interface 160 may allow the member of Team N to set up a meeting with at least some other team members (e.g., members A and E may be selected for the meeting, and member B may be skipped). Interface 160 includes a communication space 163, which may include a video window, a text window, a whiteboard, and the like. Additionally, interface 160 may include a history of communications between the users, such as past text messages, past video or audio calls (e.g., a previous dial list or recordings of past calls), past conferences, and the like. Also, interface 160 may include a list 165 that shows members A-E. In an example embodiment, checkmarks may be used next to members A-E for selecting which members to communicate via communication space 163.

Data link module 140, as shown in FIG. 1A, may be a plugin application for an email system 105. Additionally, or alternatively, data link module 140 may be a browser plugin or/and a plugin for team system 106. Additionally, or alternatively, data link module 140 may interact with one or more servers of email system 105 and one or more servers of team system 106. Data link module 140 may be configured to analyze data of systems 105 and 106 and provide additional information for users of systems 105 and 106. Thus, data link module 140 is configured to act as a link between systems 105 and 106, as indicated by arrow 108.

FIG. 1B shows an example process 102 for selecting a team and conducting a meeting using systems 105 and 106, and module 140, consistent with disclosed embodiments. Some steps of process 102 may be performed by an attendee using system 105, some steps may be performed by module 140, and other steps may be carried out by system 106. At step 171, prospective meeting attendees 110 are invited to a meeting 180 via an interface of system 105. For example, one of the users of system 105 (herein referred to as an inviter) may create meeting invitation 114 and email meeting invitation 114 to attendees 110 via system 105. At step 173, module 140 is configured to match or select a team for meeting 180, and at step 175, meeting 180 is conducted via an interface of team system 106.

Figure 2A:
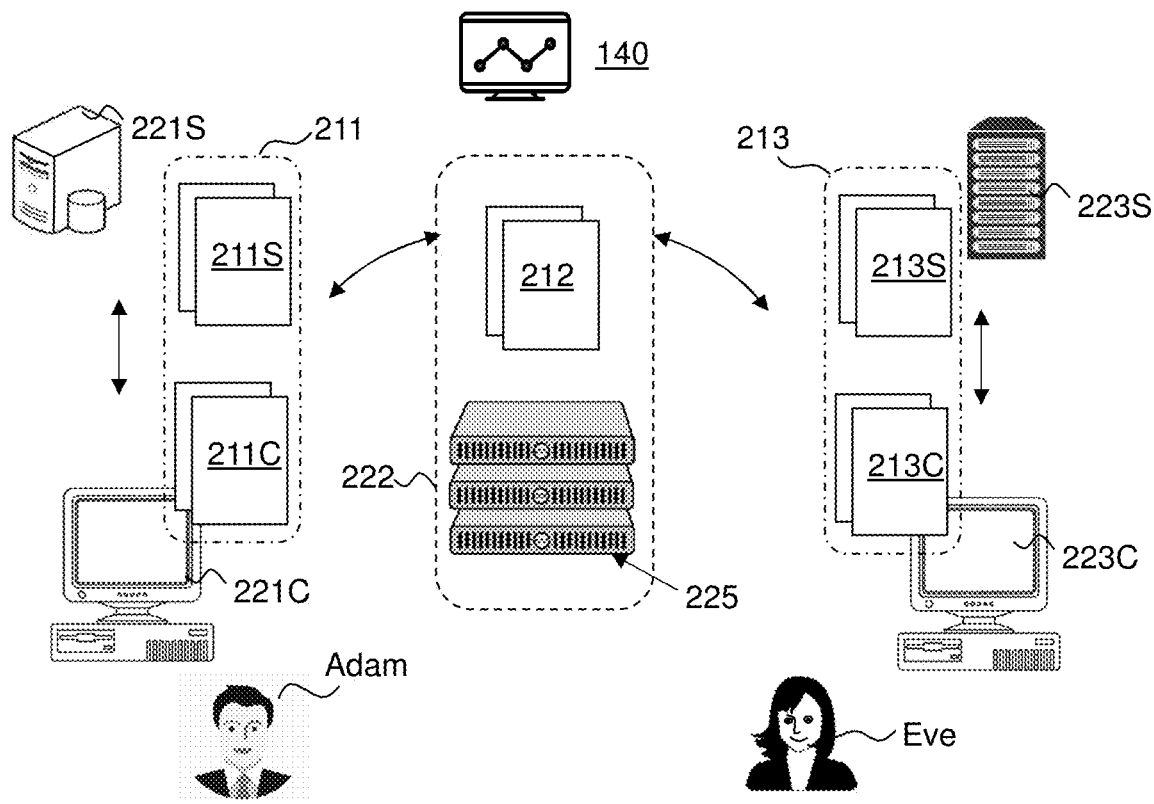
FIG. 2A shows example modules used for associating a team with a meeting, consistent with disclosed embodiments.

FIG. 2A shows example modules of data link module 140 used for associating a team with a meeting, consistent with disclosed embodiments. In an example embodiment, data link module 140 includes a module 211 for obtaining email data (also referred to herein as first information) from computing devices associated with email system 105. In an example embodiment, email data may include any suitable data obtained from system 105, such as identities of prospective meeting attendees 110 obtained from meeting appointments stored in a calendar of system 105, emails, subjects of emails, timestamp of emails, email headers including email senders and recipients, to-do lists, and the like.

In an example embodiment, email system 105 includes a server 221S for serving data of email system 105 to a client device 221C (while one client device is shown, server 221S may serve data to multiple client devices). Module 211 includes a client-side application 211C (e.g., a browser plugin) configured to interact with email system 105 being part of client device 221C. For example, client-side application 211C may include an interface for an example user Adam (herein, referred simply as Adam) of system 105 for adjusting various parameters of module 211. For example, Adam may allow or prohibit module 211 to collect information using the data of email system 105. In some cases, Adam may allow module 211 to access some of the data of email system 105 related to Adam (e.g., the data may include some of the folders of email system 105), while prohibiting module 211 to access other data. In some cases, Adam may use client-side application 211C to determine what type of information may be collected. For example, Adam may determine that subjects of email messages may be collected, but email messages may not be read by module 211. In some cases, Adam may allow module 211 to collect information from email messages received by Adam during a particular interval of time (e.g., transmitted last week, last month, and the like). Further, client-side application 211C may be configured to receive any suitable local data from client device 221C (e.g., instructions from Adam, Adam's email messages, Adam's events from a calendar of email system 105, files local to client device 221C, audio data, video data, and the like). Client-side application 211C may be further configured to upload the received local data to a server 222 for further processing by data analysis module 212. In an example embodiment, server 222 is configured to execute instructions of data analysis module 212. Server 222 includes computer devices 225 (e.g., cloud computing resources) that are not part of server 221S.

In addition to client-side application 211C, module 211 may include a server-side application 211S configured to access data (e.g., emails) of server 221S of email system 105. In an example embodiment, server-side application 211S may request data from server 221S, receive the data from server 221S, and transmit received data to data analysis module 212 for further processing. For example, server-side application 211S may be configured to form queries for server 221S. The queries may include retrieving all the email during a particular interval of time (e.g., all the email send/received in the past week or the past month) that were sent to or received by a particular user of email system 105. Further details of such queries are discussed below in relation to FIG. 2B.

Figure 2B:
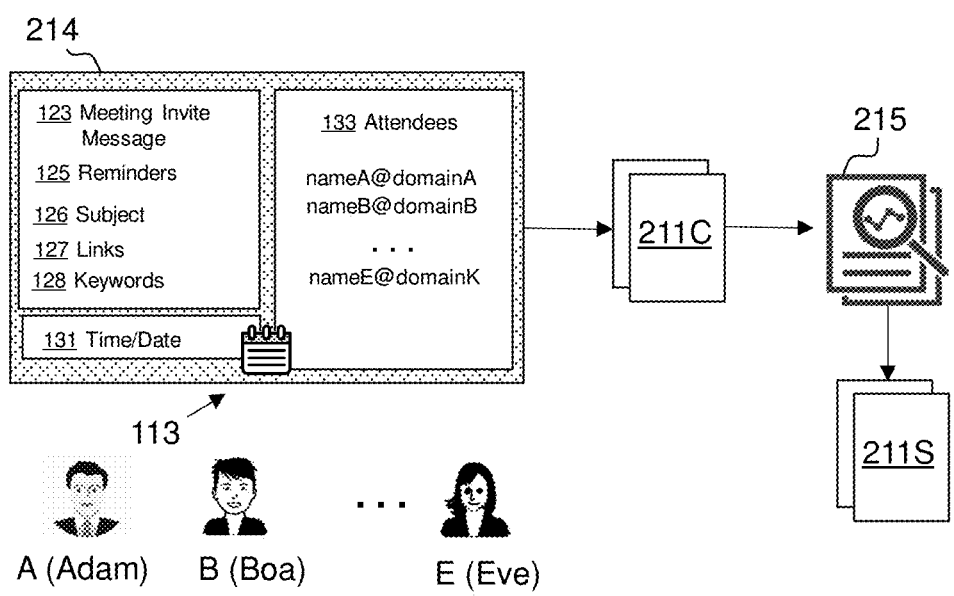
FIG. 2B shows an example process for forming and using a query, consistent with disclosed embodiments.

FIG. 2B shows an example process for forming and using the query discussed above (a query 215, as shown in FIG. 2B), consistent with disclosed embodiments. In an example embodiment, as shown in FIG. 2B, client-side application 211C may be configured to analyze meeting data 214 for meeting 180 using interface 113. Meeting data 214 may include meeting invitation message 123, reminders 125 (the reminders in some cases may include text, audio, video, or graphics data such as the time reminders, and, in some cases, a meeting location or other suitable data related to the reminder, such as a reminder to-do list before meeting 180), subject field 126 for meeting 180, links 127, keywords 128, and/or time and data 131 of meeting 180. Further, client-side application 211C may be configured to collect email addresses NameA@domainA through NameE@domainE of all (or at least some) of the attendees 133 of meeting 180. After obtaining meeting data 214, client-side application 211C may be configured to create query 215, which may then be used as an input for server-side application 211S. It should be appreciated that the process shown in FIG. 2B is one possible process of obtaining query 215. In an alternative embodiment, when meeting data 214 is stored at server 221S, server-side application 211S may be configured to first analyze meeting data 214, and then form query 215. Subsequently, query 215 may be used by server-side application 211S for requesting data from server 221S.

In various embodiments, data obtained by either client-side application 211C or server-side application 211S may be transmitted to server 222 and analysis module 212 for further processing, as shown in FIG. 2A.

Returning to FIG. 2A, data link module 140 may further include another module 213 for obtaining team data (also referred to as second information) from computing devices associated with team system 106. In an example embodiment, team data may include any suitable data obtained from team system 106, such as names of teams found in team system 106, metadata for the various teams, identities of members of the teams, chat feeds for different teams, or any other communication data transmitted within team system 106 (e.g., audio and video data transmitted between members of a team, and the like).

Similar to module 211, module 213 contains a client-side application 213C and a server-side application 213S. Client-side application 213C may interact with an implementation of team system 106 installed on client device 223C. Similarly, server-side application 213S may interact with an implementation of team system 106 installed on a server 223S. In an example embodiment, server 223S includes computing devices and software applications configured to serve data of team system 106 to client device 223C (while one client device is shown, server 223S may serve data to multiple client devices). In an example embodiment, client-side application 213C may be a browser plugin.

In an example embodiment, client-side application 213C may include an interface for a user Eve (herein, referred simply as Eve) and be configured to allow Eve to adjust various parameters of module 213. For example, Eve may allow or prohibit module 213 to collect information using data of team system 106. In some cases, Eve may allow module 213 to access some of the data of the team's communications related to Eve. For example, Eve may allow module 213 to access some of the electronic messages for various teams in which Eve is a member (such teams will be referred to herein as Eve's teams), while prohibiting module 213 to access other data. In some cases, Eve may use client-side application 213C to determine what type of information may be collected. For example, Eve may determine that all of the electronic communication (e.g., chat feeds) in all of Eve's teams may be collected. In some cases, Eve may allow module 213 to collect information from teams in which Adam is also a member (herein referred to as Adam's and Eve's teams) and prohibit module 213 to collect any other information. In some cases, Eve may allow a collection of data only for electronic data communicated during a particular interval of time (e.g., transmitted last week, last month, and the like). In various embodiments, client-side application 213C may be configured to receive any suitable local data from client device 223C (e.g., instructions from Eve, Eve's to-do lists, Eve's events from a calendar associated with Eve's teams, files local to client device 223C, Eve's audio data, video data, and the like). Client-side application 213C may be further configured to upload the received local data to server 222 for further processing by data analysis module 212.

In addition to client-side application 213C, module 213 may include a server-side application 213S configured to access data of server 223S of team system 106. In an example embodiment, server-side application 213S may request data from server 223S, receive the data from server 223S, and transmit received data to data analysis module 212 for further processing. For example, server-side application 213S may be configured to form queries for server 223S, similar to how server-side application 211S forms queries for server 221S (with a distinction that application program interface (API) for server 223S may be different from the API for server 221S). The queries may include retrieving electronic data (e.g., electronic text messages, audio data, image data, or video data) for a given team during a particular interval of time (e.g., all the electronic data for the team communicated in the past week or the past month).

Analysis module 212 may be configured to analyze data received from modules 211 and 213. One of the tasks of analysis module 212 may be to identify prospective meeting attendees 110, determine a subject of a meeting (e.g., meeting 180), and determine a most likely team within the team system 106 that can be associated with meeting 180. In another embodiment, the content and context of the meeting may be used for determining a most likely team within the team system 106 that can be associated with meeting 180. Aspects of the present disclosure discuss various approaches used by analysis module 212 to select a team associated with meeting 180. For cases when such association is not possible (such cases will be further discussed below), analysis module 212 may be configured to interact with server-side application 213S to request server 223S to create a new team. Additionally, analysis module 212 may be further configured to interact with module 211 and module 213 to send messages and any type of necessary data to prospective meeting attendees 110 and/or to members of various teams of team system 106.

In an example embodiment, data link module 140, and in particular, analysis module 212, may perform various operations for managing communications between prospective meeting attendees 110. For example, analysis module 212 may receive data corresponding to an invitation for a meeting (e.g., the invitation may be received via client-side application 211C or server-side application 211S transmitting meeting-related data to module 212). In an example embodiment, the invitation may include information (e.g., the first information) that identifies prospective meeting attendees 110. Additionally, module 212 may also receive data (e.g., the second information) for a plurality of teams of system 106. The team data may include data identifying members for each one of the plurality of teams. Analysis module 212 may determine whether an attendee (e.g., attendee B, i.e., Boa) from prospective meeting attendees 110 has an account with team system 106 and if Boa does not have the account with the team system, prompt Boa to create the account. For example, analysis module 212 may send an electronic message to Boa to invite Boa to create an account with team system 106. It should be appreciated that if Boa refuses to create the account with team system 106, then analysis module 212 will not be able to associate Boa with a team, and Boa will not be able to participate in a video or audio conference of the meeting conducted via team system 106.

Alternatively, in some cases, Boa may be allowed a guest access to team system 106, and be able to participate in a video or audio conference without requiring him to be a member of a particular team. In some cases, Boa may have a guest access to a temporary chat feed, which may include conversations (i.e., chat feeds) of other meeting members who have accounts with team system 106. Herein, a chat feed is referred to as a chain of text messages sent between members of a team. It should be appreciated that more than one attendee of a meeting (e.g., meeting 180) may be a guest attendee (i.e., may not have an account with team system 106).

In an example embodiment, when a guest attendee (e.g., Boa) is present, a guest team may be created by team system 106, that may, in some cases, have full functionality of a regular team (i.e., a guest attendee may have access to interface 160 for the guest team and communicate with other guest team members via video, audio, image data, or text data). Alternatively, the guest team may have a limited functionality (e.g., Boa may not be allowed to communicate with other guest team members via text messages before meeting 180). After completion of meeting 180, Boa may lose the ability to access the data of the guest team, while other members of meeting 180 who have accounts with team system 106 (herein, such members are referred to as account-holding members or account-holding prospective meeting attendees) may continue to have access to the guest team. In some cases, Boa may have limited (or full) access to the guest team (and to the guest team data) even after the completion of meeting 180, and in other cases, Boa may have limited (or full) access to the guest team for a specific duration of time (e.g., for a few days, a week, a month, or the like). In an example embodiment, the guest team may be identified by an address link and may be accessed via a web browser. In an example embodiment, data link module 140 may have preset rules regarding Boa's access to guest team data. Alternatively, a selected authority (e.g., an attendee who sent an invitation for the meeting or a group of meeting attendees) may be configured to determine particular permissions for Boa to access the guest team interface and data associated with the guest team.

It should be appreciated that access to either one of electronic communication system 105 or team system 106 may be achieved via any suitable means (e.g., internet browser, stand-alone desktop application, smartphone application, television application, a virtual artificial intelligence assistant such as Alexa, Google Assistant, Ski, or any other suitable application that utilizes either a graphical user interface, a voice interface, or user gestures) and that may be installed on a client device (e.g., device 221). In various embodiments, team system 106 may be configured to interact with the hardware of client device 221, such as a camera, a microphone, a mouse, a keyboard, a virtual reality interface, or a haptic interface. The hardware may be used to capture any user-related data such as a video, audio, user gestures, keyboard strokes, mouse movements, hand movements, body movements, and the like. Further, a meeting (e.g., meeting 180) may not be limited to a video or an audio conference but may be a presentation of information (e.g., slides) of one attendee (or a few prospective meeting attendees) to another attendee (or other prospective meeting attendees), or may be a video game, and interface to a software program, and the like. In an example embodiment, team system 106 may provide interface 163, as shown in FIG. 1A, that may include interactive elements (e.g., interactive graphical elements, such as buttons, text fields, dials, etc.) used by prospective meeting attendees during meeting 180.

Analysis module 212 may be configured to compare the email data (e.g., email data may include information that identifies prospective meeting attendees 110) with the team data (e.g., team data may include information that identifies members for each one of the plurality of teams) to determine whether prospective meeting attendees 110 match members of one of the teams of team system 106. A match may be established using, for example, a match metric computed for each one of the plurality of teams. The match metric may be any suitable indicator (e.g., a number denoting a probability of a match). Various ways of computing the match metric are described in further detail below.

After computing the match metric, a team that has the highest value of the match metric may be determined by module 212 as a matching team. In an example embodiment, the match metric may be required to be above a target match threshold value. For example, if the match metric varies between zero and one, the target match threshold value may be, for example, 0.5. For cases, when the match metric, when computed for each team of team system 106, is below the target match threshold value, a new team may be created for prospective meeting attendees 110 of a planned meeting. Once the matching team is established, or once a new team is created, a link to the matching team (or any other suitable information related to the matching team, such as the matching team name, the matching team identification number, and the like) may be sent to prospective meeting attendees 110.

In addition to comparing the information that identifies prospective meeting attendees 110 with the information that identifies members for each one of the plurality of teams, analysis module 212 may also compare a topic for a meeting (e.g., meeting 180) with subjects for each one of the plurality of teams, and when the topic matches a subject of one of the teams, the match metric may be updated (e.g., increased by a predefined selected value).

In an example embodiment, a match metric M may be selected such that $M=m_1+m_2$, where $m_1$ is a first match metric part corresponding to a match between prospective meeting attendees 110 and members of a particular team, while $m_2$ is a second match metric part corresponding to a match between a topic for a meeting with the subject of that particular team. In an example embodiment, $m_1=0 \ldots v_1$, and $m_2=0 \ldots v_2$. with $v_1+v_2$ being a maximum value for metric M. For example, if $v_1+v_2=1$, match metric M can range between 0 and 1. The ratio of $v_1/v_2$ indicates the importance of the first match metric part $m_1$ relative to the second match metric part $m_2$. For example, if $v_1/v_2=1$, then $m_1$ may have the same importance as $m_2$. Alternatively, if, for example, $v_1/v_2=2$, $m_1$ may be a more important indication of a match than $m_2$.

In some cases, analysis module 212 may also analyze multiple electronic communications (e.g., emails) transmitted from email system 105 to module 212. Module 212 may parse texts of the emails transmitted between a group of prospective meeting attendees from the prospective meeting attendees (herein, the group of prospective meeting attendees may include at least some of the prospective meeting attendees, such as Adam and Boa). In an example embodiment, a natural language processing algorithm may be used when parsing texts of these emails to determine one or more subjects of these emails. Similarly, analysis module 212 may analyze communications (e.g., chat feeds) of members of different teams within team system 106 and determine subjects for different chat feeds (e.g., using a natural language processing algorithm).

Figure 3A:
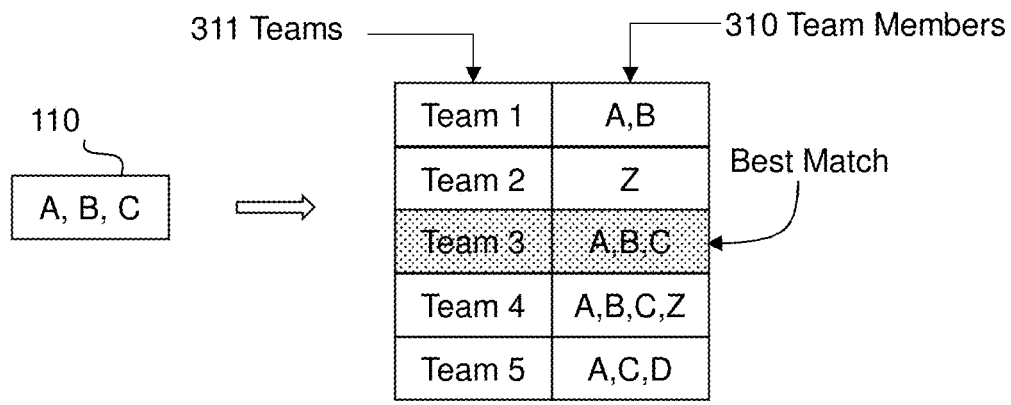
FIG. 3A shows an example approach of determining an attendee score for a team, consistent with disclosed embodiments.

FIG. 3A shows an example approach of determining an attendee score for a team, consistent with disclosed embodiments. As described above, a match metric M may be computed to determine how well a team from teams 311 matches meeting 180 involving multiple prospective meeting attendees. For example, FIG. 3A shows that prospective meeting attendees 110 (prospective meeting attendees A, B, C) may be best matched to Team 3, which includes team members 310 (team members A, B, C). In some cases, Team 4 may also be a good match for prospective meeting attendees A, B, C, as it includes members A, B, C, as shown in FIG. 3A. Herein, for clarity of the description, members "A, B, C" may be denoted by ABC, and similar shortcuts are applied to other sets of members. In an example embodiment, an attendee score AS may be calculated when comparing a set of prospective meeting attendees 110 (e.g., prospective meeting attendees ABC) with a set of members of various teams. For example, AS(ABC, ABC)=1 since there is an exact match (e.g., three prospective meeting attendees ABC match exactly three team members of Team 3, i.e., 3 out of 3 match). In an example embodiment, AS(ABC, ABCZ)=1, since there is a complete match between the prospective meeting attendees and the members of Team 4. Also, AS(ABC, Z)=0, since there is no match found, and AS(ABC, ACD)=⅔ since there are only two prospective meeting attendees, A and C, that match members of Team 5. Thus, using the attendee score, as defined above, determines how well prospective meeting attendees match team members. Alternatively, the AS may also determine how well the team members match the prospective meeting attendees. For example, AS(ACD, ABC)=⅔, shows that team members ACD only partially match prospective meeting attendees ABC (e.g., only two out of three members match prospective meeting attendees ABC). Similarly, AS(ABCZ, ABC)=¾ indicates that only three out of four team members match prospective meeting attendees ABC. Note that AS(ABCZ, ABC)=AS(ABC, ABCZ), as shown above. In some embodiments, a symmetric attendee score (SAS) may be used, such as SAS (ABC, ABCZ)=½·(AS(ABCZ, ABC)+AS(ABC, ABCZ))=⅜+⅘=⅞. Note, SAS (ABC, ABC)=1, and SAS(ABC, ABD)=⅔.

Figure 3B:
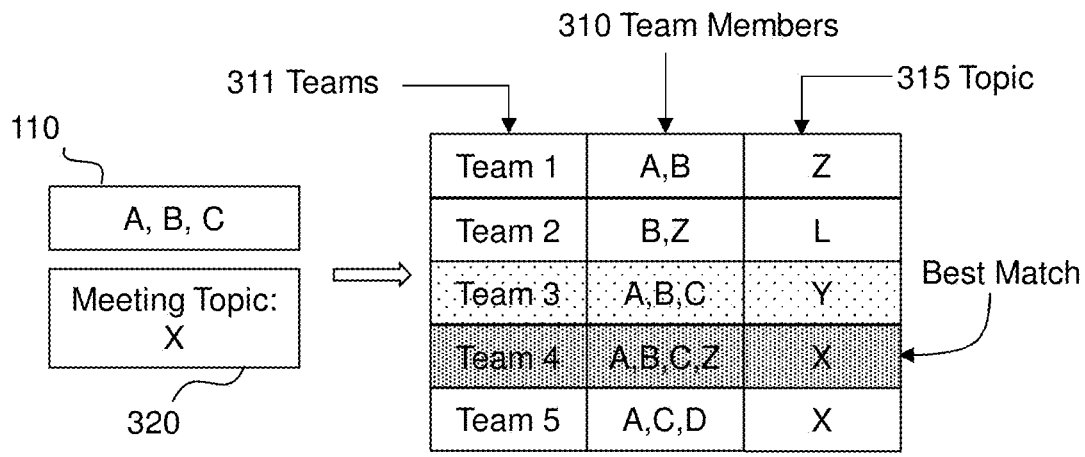
FIG. 3B shows an example approach of determining a topic score for a team, consistent with disclosed embodiments.

FIG. 3B shows an example approach of determining a topic score for a team, consistent with disclosed embodiments. In an example embodiment, a match is established by comparing not only prospective meeting attendees ABC of a meeting (e.g., meeting 180) to team members, but also a meeting topic X with topics of teams Team 1 through Team 4. As shown in FIG. 3B, Team 4 may be the best match since the topic of Team 4 is X, which is the same as the topic of meeting 180. It should be appreciated that the terms "topic" and "topic score" relate to any context related to meeting 180 and contextual information for a team (e.g., Team 1). In an example embodiment, the term "topic" encapsulates all the context-related information related to meeting 180 and Team 1. As an example, the topic may be determined based on the topic identified in meeting invitation 114. For example, invitation 114 may include meeting invite message 123 that includes a field describing the topic for meeting 180. Alternatively, the topic of meeting 180 may be determined by parsing meeting invite message 123 and/or related emails between prospective meeting attendees (e.g., attendees A, B, and C). In an example embodiment, a natural language processing algorithm may be used when parsing texts of these emails to determine one or more topics of these emails based on email content. Similarly, the topic of Team 1 may be analyzed by parsing communications (e.g., chat feeds) of members of Team 1 (e.g., using a natural language processing algorithm). In various embodiments, parsing may be performed by analysis module 212. Parsing text communications may be one possible approach for determining the topic. Alternatively, computer-based methods may be used to determine the topic for meeting 180 and for Team 1 by processing related images, audio, or video data found in emails related to meeting 180 or communications for Team 1. It is noted that mapping contextual information to a single entity—topic using suitable computer-based methods is one example process. Alternatively, the contextual information may be mapped to multiple topics. For example, the contextual information for meeting 180 determined from emails may be used to determine a first list of topics (in some cases, the list of topics may be hierarchical). A similar list of topics (a second list of topics) may be determined for Team 1. The first list of topics may be compared with the second list of topics using any suitable approach (e.g., each topic in the first list of topics may be compared with a corresponding topic in the second list of topics and a match for each such comparison may be determined).

In various embodiments, any suitable content related to a meeting (e.g., meeting 180) may be analyzed in order to determine a topic of the meeting and subsequently associate a team based on this determination. For example, the content for meeting 180 may include on-going audio data (i.e., audio data related to conversations of prospective meeting attendees), video data, images, interactive forms, slides, attachments, shared screen content, databases, tables, and so forth. In an example embodiment, the content may include email messages of system 105. Additionally, any suitable content (e.g., on-going audio data, video data, images, attachments, shared screen content, and the like) related to communications of a team of team system 106 may be analyzed for determining a topic of that team.

In an example embodiment, topics may be compared using a topic score TS (also referred to as a subject score). The topic score determines the probability that one topic matches another. For example, TS ("Running", "Sports") has a higher value than TS ("Running", "Plants"), and TS(X, X) has the highest value (e.g., a value of 1) since the topics match exactly. As shown in FIG. 3B, Team 3 has the highest attendee score AS(ABC, ABC)=1, but a lower topic score TS(X,Y)=0.8.

In an example embodiment, a match metric M may be a weighted average of an attendee score and a topic score. For example, $M=w_1 AS + w_2 TS$, where $w_1+w_2=1$. In an example embodiment, a simple average may include $w_1=w_2=½$. In an example embodiment, the match metric for Team 3 is calculated as M(Team 3)=½·(SAS(ABC, ABC)+TS(X, Y))=½·(1+0.8)=0.9. Similarly, M(Team 4)=½·(SAS(ABC, ABCZ)+TS(X, X))=½·(⅞+1)~0.94, thus, M(Team 4)>M(Team 3), and Team 4 may be selected to be the matching team for meeting 180 between prospective meeting attendees ABC.

FIG. 4 shows example match conditions between prospective meeting attendees of a meeting and members of a team, consistent with disclosed embodiments. For example, FIG. 4 shows a table 401 of various matches between prospective meeting attendees 110, shown in the first column, and team members 310, shown in the second column. A match condition (e.g., a descriptive equivalent of a match metric) is shown in the third column, and an action that may be implemented by data link module 140 is shown in the fourth column. For instance, the first row of table 401 shows that when prospective meeting attendees ABC are compared with members ABC, analysis module 212 concludes that there is an "Exact Match" (column 3), associates a value for match metric M (M=M1), and executes an action (column 4) of associating a matching team with prospective meeting attendees 110 (e.g., providing prospective meeting attendees 110 a link to the matching team).

The second row of table 401 shows that when prospective meeting attendees ABC are compared with members ABCDEFG, analysis module 212 concludes that prospective meeting attendees 110 are a subset of team members 310, and determines that a match condition is a "Subset Match" (column 3), associates a value for match metric M (M=M2), and executes an action (column 4) of associating a matching team with prospective meeting attendees 110.

The third row of table 401 shows that when prospective meeting attendees ABC are compared with members ABDEF, analysis module 212 concludes that prospective meeting attendees 110 only partially match team members 310, and determines that a match condition is a "Partial Match" (column 3), associates a value for match metric M (M=M3), and executes an action (column 4) of associating a matching team with prospective meeting attendees 110 and offering to add attendee C to the team with members ABDEF.

The fourth row of table 401 shows that when prospective meeting attendees DEFG do not match any of team members 310 for any of teams 311, analysis module 212 determines that there is a "No Match" (column 3), associates a value for match metric M (M=M4), and executes an action (column 4) of offering to create a new team for prospective meeting attendees DEFG.

The fifth row of table 401 shows that when prospective meeting attendees ABCX only partially match team members ABC because of attendee X not having an account with team system 106, analysis module 212 determines that there is a "Partial Match with Guest" (column 3), associates a value for match metric M (M=M5), and executes an action (column 4) of offering to invite attendee X to create an account with team system 106, and associating a matching team with prospective meeting attendees 110 when attendee X creates an account with team system 106. As described above, if attendee X does not create the account with team system 106, he/she may not be associated with the matching team, while prospective meeting attendees ABC may be associated with the matching team.

The sixth row of table 401 shows that when prospective meeting attendees ABC are compared with members ABCDEF, analysis module 212 concludes that prospective meeting attendees 110 are a subset of team members 310, and determines that a match condition is a "Subset Match" (column 3), associates a value for match metric M (M=M2), and executes an action (column 4) of associating a matching team with prospective meeting attendees 110 and offering to allow team members DEF to become prospective meeting attendees 110, and participate in a meeting (e.g., meeting 180) for those prospective meeting attendees. In some cases, not all team members DEF may be offered an opportunity to become some of prospective meeting attendees 110 for meeting 180. For instance, only a team member (e.g., E (Eve)) with an expertise in a topic discussed during meeting 180 may be invited to participate in meeting 180 (i.e., invited to become one of prospective meeting attendees 110). In an example embodiment, the expertise level of Eve in a topic of meeting 180 may be determined based on analysis of chat feed or any other data of various teams in which Eve is a member. The analysis may include natural language processing analysis, audio analysis, image analysis, and the like. In an example embodiment, the analysis may be conducted by analysis module 212 using a machine-learning approach (e.g., using neural networks, decision trees, and the like). Further, the topic of meeting 180 may be determined by analysis module 212, as discussed above.

Figure 5:
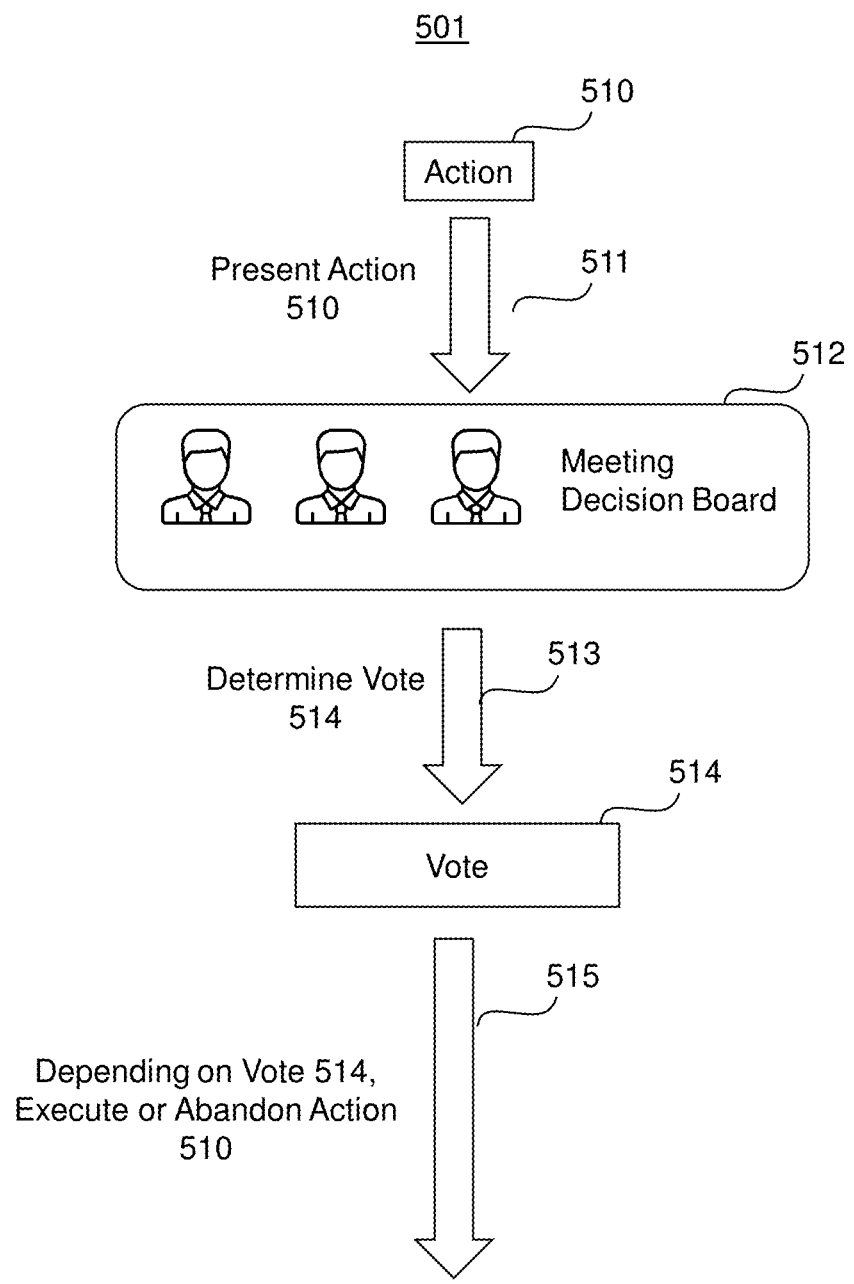
FIG. 5 shows an example process for approving an action for managing communications, consistent with disclosed embodiments.

FIG. 5 shows an example process for approving an action for managing communications (e.g., for associating a team with a meeting, for inviting attendees to become team members, for inviting attendees to become members of team system 106, for inviting team members to become prospective meeting attendees, and the like, as further discussed herein), consistent with disclosed embodiments. For example, some of the actions, as shown in table 401, column 4, may require approval by a meeting decision board 512, as shown in FIG. 5. As shown in FIG. 4, table 401, the action may include offering to invite attendee X to create an account, associating a matching team to meeting 180, offering to add an attendee to a group of team members, offering to create a group, offering for some of the team members to become prospective meeting attendees 110, or other related actions. In an example embodiment, at step 511, an action 510 may be presented to the decision board 512. Decision board 512 may include several members who, at step 513, may vote 514 ("Yes/No") on action 510. If vote 514 approves action 510, data link module 140 may execute action 510 at step 515. Alternatively, if vote 514 rejects action 510, data link module 140 abandons the execution of action at step 515. In an example embodiment, decision board 512 may include all (or some) of prospective meeting attendees 110. In some cases, decision board 512 may include a meeting organizer or a meeting moderator. Herein, the meeting organizer may be a person who sends an invitation to meeting 180, and the meeting moderator may be a person authorized to make changes to meeting 180, submit material for meeting 180, add or remove prospective meeting attendees from meeting 180, and the like. In some cases, the meeting moderator may be the same person as the meeting organizer.

FIG. 6A shows an example process for determining a probability for a team to match a meeting, consistent with disclosed embodiments. The probability may be determined by evaluating a match metric based on information available in emails of prospective meeting attendees 110 (Adam, Boa, and Eve). As an illustrative example, Adam, Boa, and Eve are planning a meeting (e.g., meeting 180) related to a new weight loss program, which they discussed in multiple emails $E_1$-$E_4$. In an example embodiment, Adam is an organizer of meeting 180. For example, Adam may request data link module 140 to associate a team with meeting 180, and after data link module 140 completes the team association (e.g., obtains a link to the team that is associated with meeting 180), Adam sends the meeting invitation that contains the link to the team. In an example embodiment, Adam interacts with data link module 140 via a browser plugin, as shown in FIG. 1A, to request the team association.

Additionally, or alternatively, data link module 140 may be configured to add a link to the team after the invite has been emailed to (or put on calendars of) Boa, Eve, and Adam. For example, data link module 140 may analyze the invite to meeting 180 (e.g., analyze data meeting data 214, as shown in FIG. 2B) and analyze emails transmitted between Boa, Eve, and Adam (e.g., emails $E_1$-$E_4$) obtained by querying email system 105 (e.g., as described before, server-side application 211S may be configured to query email system 105 for various emails).

Further, analysis module 212 of module 140 may analyze data for related teams Team 1 through Team 3 in which at least some of prospective meeting attendees 110 are members (in an example embodiment, all other teams 311 may not be related to Adam, Boa, and Eve). For example, module 212 may be configured to determine that members of Team 1 are Adam and Boa, members of Team 2 are Adam, Boa, and Eve, and members of Team 3 are Adam and prospective meeting attendees C and F. Also, module 212 may be configured to determine a topic (or several topics) for each one of teams 311. For instance, module 212 may further determine that a topic (e.g., the topic of Team 1 is "Flowers," the topic of Team 2 is "Running Shoes" and "Diet," and the topic of Team 3 is "Tennis"). In an example embodiment, as described above, module 212 may analyze chat feeds (or other team-related data) for teams Team 1 through Team 3 to determine topics for these teams. For instance, a natural language processing algorithm may be used to analyze chat feeds to determine the topics. In some cases, each team of teams 311 may be configured to include metadata describing a topic for a team, a list of members of the team, an expertise level of each member in the team, links to other teams related to the topic of the team, link to members of other teams who have expertise in the topic of the team, or any other suitable metadata.

Analysis module 212 may for each topic "Flowers," "Running Shoes," "Diet," and "Tennis" be configured to determine a topic probability TP for each one of emails $E_1$-$E_4$. In an example embodiment, emails $E_1$-$E_4$ arrive at respective times $T_1$-$T_4$. The topic probability of an email (e.g., $E_1$) indicates a probability that a given topic (e.g., "Flowers") is the topic of email $E_1$. In some cases, the same email may include more than one topic. For example, email $E_1$ may discuss flowers and/or a diet. As shown in FIG. 6A, module 212 calculates probabilities (a probability may range between 0 and 1). For example, $TP_1$(Tennis)=0.1 indicates that topic probability for email $E_1$ being tennis is low, and $TP_1$(Tennis)=0.9, indicates that topic probability for email $E_1$ being tennis is high. In an example embodiment, as shown in FIG. 6A, for email $E_1$, $TP_1$(Tennis)=0.1, $TP_1$(Diet)= 0.2, $TP_1$(Flowers)=0.8, and $TP_1$(Running Shoes)= 0.8. Similarly for email $E_2$, $TP_2$(Tennis)=0.1, $TP_2$(Diet)=0.2, $TP_2$(Flowers)=0.8, and $TP_2$(Running Shoes)=0.7; for email $E_3$, $TP_3$(Tennis)=0.5, $TP_3$(Diet)=0.0, $TP_3$(Flowers)=0.1, and $TP_3$(Running Shoes)=0.8; and for email $E_4$, $TP_4$(Tennis)= 0.9, $TP_4$(Diet)=0.0, $TP_4$(Flowers)=0.9, and $TP_4$(Running Shoes)=0.1. In an example embodiment, the probability that emails $E_1$-$E_4$ discuss tennis can be calculated as a weighted average given by $P_T=\Sigma_{i=1 \ldots 4} w_i(T_i) \cdot TP_i$(Tennis), where a weight $w_i$ may (or may not) depend on a respective time $T_i$, with i being in a range of one to four (also, $\Sigma w_i(T_i)$=1). Similarly, in an example embodiment, the probability that emails $E_1$-$E_4$ discuss "Diet," "Flowers," or "Running Shoes" can be calculated as a weighted average given by either $P_D=\Sigma_{i=1 \ldots 4} w_i(T_i) \cdot TP_i$(Diet), $P_F=\Sigma_{i=1 \ldots 4} w_i(T_i) \cdot TP_i$(Flowers), or $P_R=\Sigma_{i=1 \ldots 4} w_i(T_i) \cdot TP_i$(Running Shoes), respectively. It should be appreciated that using weighted averages for calculating probabilities $P_T$, $P_D$, $P_F$, and $P_R$, may be one possible approach, and any other suitable approaches for estimating such probability using topic probabilities TP may be used.

Analysis module 212 may also determine a conditional probabilities $P_{WT}$, $P_{WD}$, $P_{WF}$, and $P_{WR}$ (herein referred to as $P_{WT}$-$P_{WR}$) that emails $E_1$-$E_4$ are related to a "Weight Loss Program," when respective topics "Tennis," "Diet," "Flowers," or "Running Shoes" are discussed. For example, conditional probability $P_{WT}$=P(Weight Loss Program|Tennis) indicates a probability that the emails $E_1$-$E_4$ are related to the "Weight Loss Program" when "Tennis" is a topic of emails $E_1$-$E_4$. Similarly, conditional probability $P_{WD}$=P(Weight Loss Program|Diet) indicates a probability that the emails $E_1$-$E_4$ are related to the "Weight Loss Program" when "Diet" is a topic of emails $E_1$-$E_4$; conditional probability $P_{WF}$=P (Weight Loss Program|Flowers) indicates a probability that the emails $E_1$-$E_4$ are related to the "Weight Loss Program" when "Flowers" are a topic of emails $E_1$-$E_4$, and conditional probability $P_{WR}$=P(Weight Loss Program|Running Shoes) indicates a probability that the emails $E_1$-$E_4$ are related to the "Weight Loss Program" when "Running Shoes" is a topic of emails $E_1$-$E_4$. Analysis module 212 computes a measure of a probability $P_A$ (associative probability) that team with topic "Tennis" is associated with a meeting (e.g., meeting 180) for "Weight Loss Program" by computing a product of conditional probability $P_{WT}$ and probability that emails $E_1$-$E_4$ are related to "Tennis"; thus, $P_A$(Tennis)=$P_{WT} \cdot P_T$. Similarly, $P_A$(Diet)=$P_{WD} \cdot P_D$, $P_A$(Flowers)=$P_{WF} \cdot P_F$, and $P_A$(Running Shoes)=$P_{WR} \cdot P_R$.

As an example calculation, assume that weights $w_1$ $(T_1) \ldots w_4(T_4)$=0.25. In an example embodiment, $P_{WD}$ may be a relatively large number (e.g., 0.9), however since "Diet" is hardly discussed in emails E1-E4 (e.g., $TP_1$(Diet)=0.2, $TP_2$(Diet)=0.1, and $TP_3$(Diet)=$TP_4$(Diet)=0.0), $P_A$(Diet)= 0.9·(0.2·0.25+0.1·0.25+0.0·0.25+0.0·0.25)~0.067. Similarly, for $P_{WT}$=0.6 (tennis is a cardio activity related to weight loss), one obtains that $P_A$(Tennis)=0.6·0.25·(0.1+0.1+0.5+ 0.9)=0.24. Similarly, selecting $P_{WR}$=0.7 (running shoes are likely to be associated with weight loss), $P_A$(Running Shoes)= 0.7·0.25·(0.8+0.7+0.8+0.1)=0.42. Finally, selecting $P_{WF}$=0.05 (flowers are unlikely to be associated with weight loss), $P_A$(Flowers)=0.05·0.25·(0.8+0.8+0.1+0.9)~0.033. As seen in these calculations, since $P_A$(Running Shoes) has the highest value, and members of Team 2 match prospective meeting attendees 110 (i.e., Adam, Boa, and Eve), Team 2 may be selected to be associated with a meeting record (e.g., a meeting invitation 114, as discussed above and shown in FIG. 1A) for prospective meeting attendees Adam, Boa, and Eve.

In various embodiments, selecting $P_{WT}$-$P_{WR}$ may be performed by analysis module 212. In an example embodiment, $P_{WT}$ may be the same as TS(Weight Loss, Tennis), and similarly, $P_{WD}$=TS(Weight Loss, Diet), $P_{WF}$=TS(Weight Loss, Flowers), and $P_{WR}$=TS(Weight Loss, Running Shoes). Also, since Team 2 has both "Diet" and "Running Shoes" topics, a total probability $P_A$(Running Shoes)+$P_A$(Diet)= 0.42+0.067=0.487 is computed and used for determining whether Team 2 should be associated with a meeting record (e.g., meeting invitation 114 for a meeting in which Adam, Boa, and Eve are prospective attendees).

In some cases, team communication time density TC(T) may also be a factor in determining a matching team. Herein, TC(T) is an amount of communicated data (e.g., bytes of data, number of text characters, number of messages, and the like) received in a given interval of time, such as, for example, a number of text characters communicated in an hour.

Figure 6B:
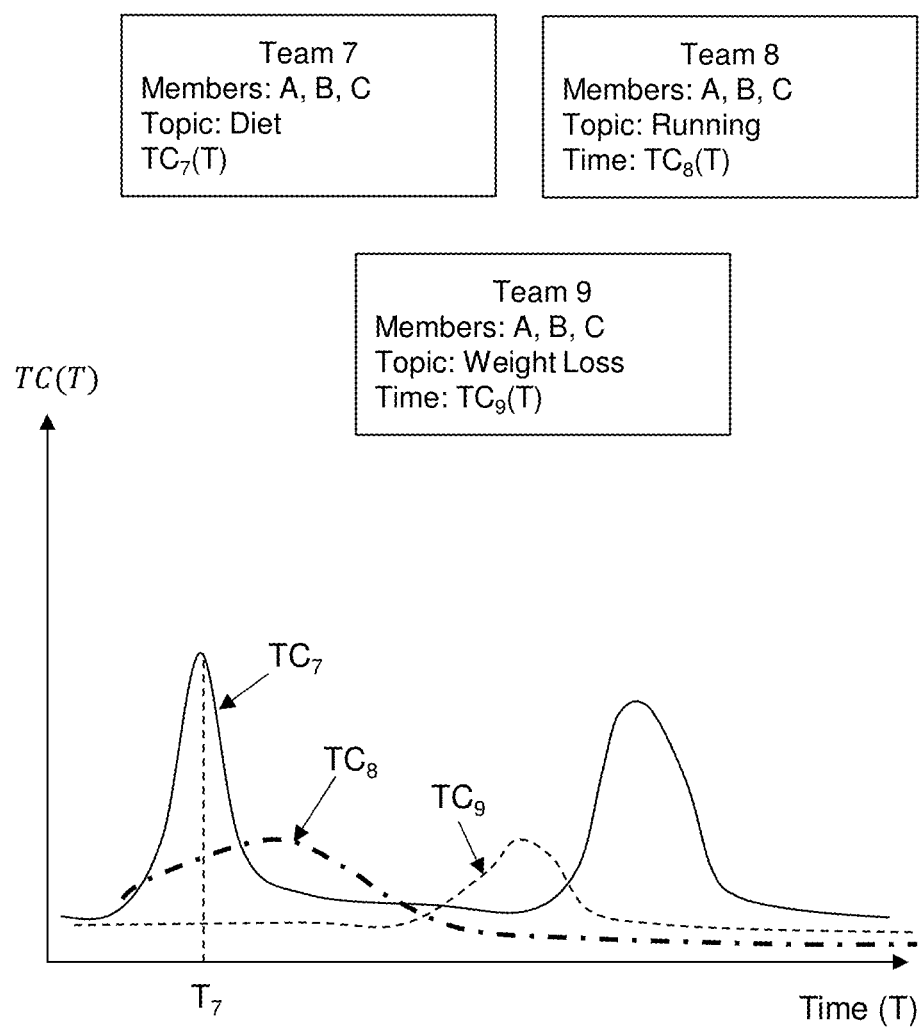
FIG. 6B is a plot of team communication time density TC(T) as a function of time (T), consistent with disclosed embodiments.

FIG. 6B is a plot of team communication time density TC(T) as a function of time (T), consistent with disclosed embodiments. In an example embodiment, as shown in FIG. 6B, Team 7-Team 9 have the same members (thus, team members may not be used for determining the matching team) and have related topics (e.g., topics related to weight loss). For such cases (and for other cases, when differentiating teams using team members and team topics may not be sufficient), TC(T) may be considered for each team to further differentiate the teams. For instance, FIG. 6B shows plots of $TC_7(T)$, $TC_8(T)$, and $TC_9(T)$, for teams Team 7-Team 9, respectively. In an example embodiment, $TC_7$ (T) may be selected since communications for Team 7 are more recent than communications for other teams, and the amount of communication for Team 7 may be higher (e.g., the amplitude of $TC_7$ ($T=T_7$) is higher than amplitudes $TC_8(T=T_7)$ and $TC_9$ ($T=T_7$) at time $T_7$. For a more precise definition, as an example embodiment, a running average over a target time window $\Delta T$ may be computed as $RTA_i(\tau; \Delta t)=(1/\Delta t) \int_\tau^{\tau+\Delta \tau} TC_i(t)dt$ and a team with the largest $RTA_i(\tau=\tau_0;\Delta t)$ may be chosen. Herein $\tau_0$ indicate a time point around which communications are considered to be the most important. For example, when $\tau_0=0$, most recent communications are considered to be important, and team with largest $RTA_i(0; \Delta t)$ may be chosen.

Figure 6C:
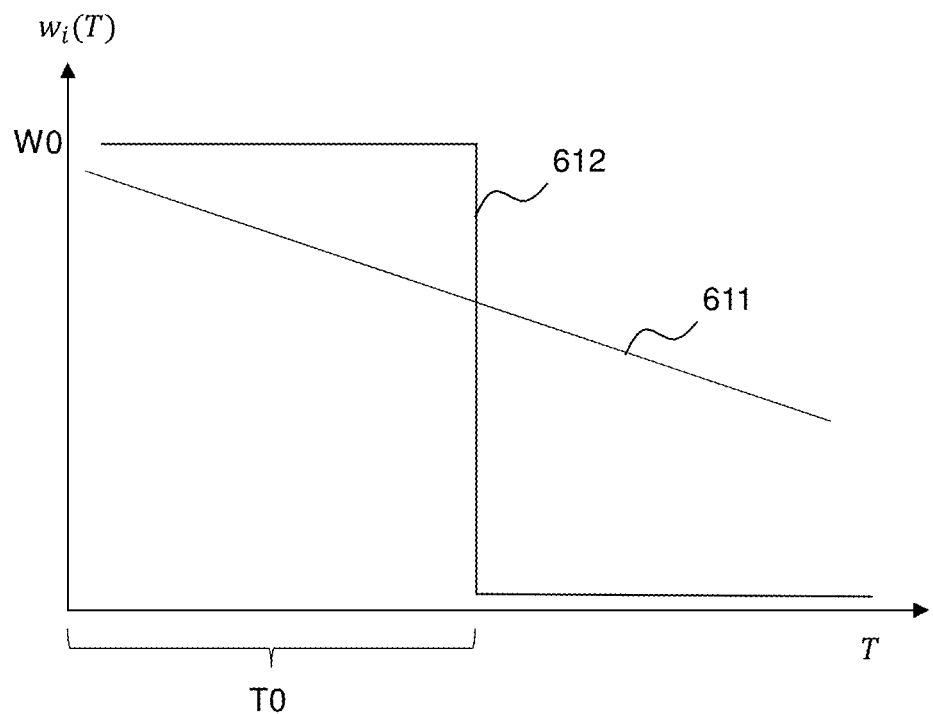
FIGS. 6C and 6D are possible plots of a weight function as a function of time, consistent with disclosed embodiments.

FIG. 6C shows a possible plot of a weight function $w_i(T)$ as a function of time T, consistent with disclosed embodiments. In an example embodiment, $w_i(T)$ may be any suitable time function. For example, $w_i(T)$ may be decreasing with time, indicating that a relevance of the email is decreasing with time. It should be appreciated that, in some cases, $w_i(T)$ may be constant in time or may increase with time, at least for some time intervals. In an example embodiment, $w_i(T)$ may continuously decrease as indicated by plot 611, or may be decreased as a step function $w_i(T \leq T_0)=W_0$, $w_i(T>T_0)=0$, as indicated by plot 612. For example, $T_0$ may equal a few days, one week, a few weeks, a month, or the like.

Figure 6D:
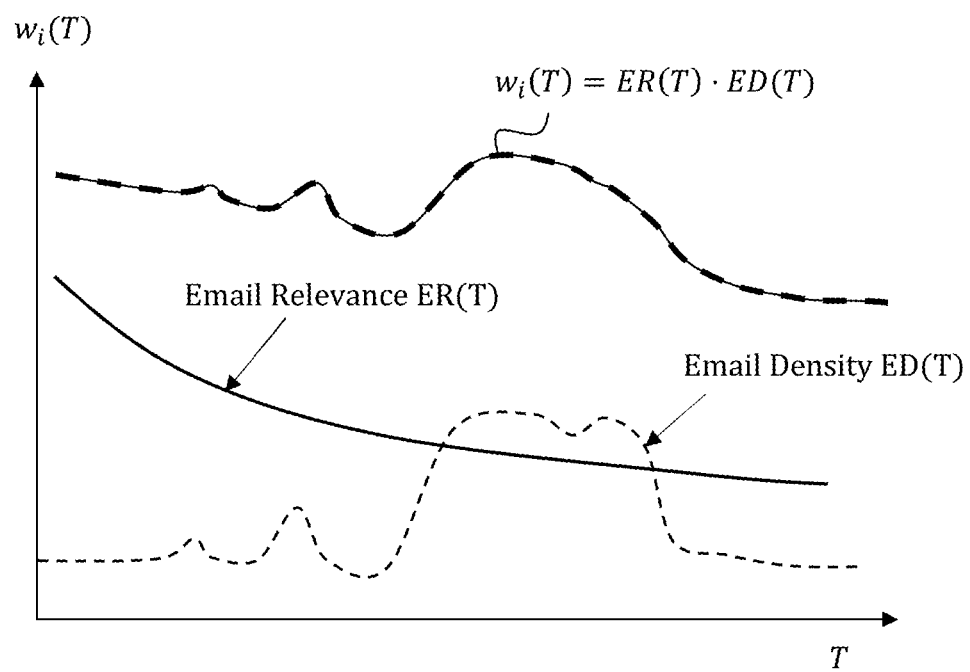

FIG. 6D shows another embodiment of a possible plot of a weight function as a function of time, consistent with disclosed embodiments. In such an embodiment, weight $w_i(T)$ depends on an email density ED(T). Email density ED(T) may be a number of emails in combination, in some cases, with email sizes, a number of text lines in emails, or other similar measures of information that are communicated in the emails (e.g., bytes of data), transmitted in a given interval of time, such as a number of emails transmitted in an hour. In some cases, email density includes only emails related to a particular topic such as "Tennis," "Flowers," and the like. In an example embodiment, weights $w_i(T)$ may be, for example, a product of ED(T) and an email relevance ER(T), $w_i(T)=ED(T) \cdot ER(T)$. Herein, email relevance ER(T) is any selected time decreasing function. For cases when ER(T) is the email density related to a particular topic, $w_i(T)$ depends on that topic (e.g., "Tennis"), i.e., $w_i(T)=w_i(T; Tennis)$.

Figure 7:
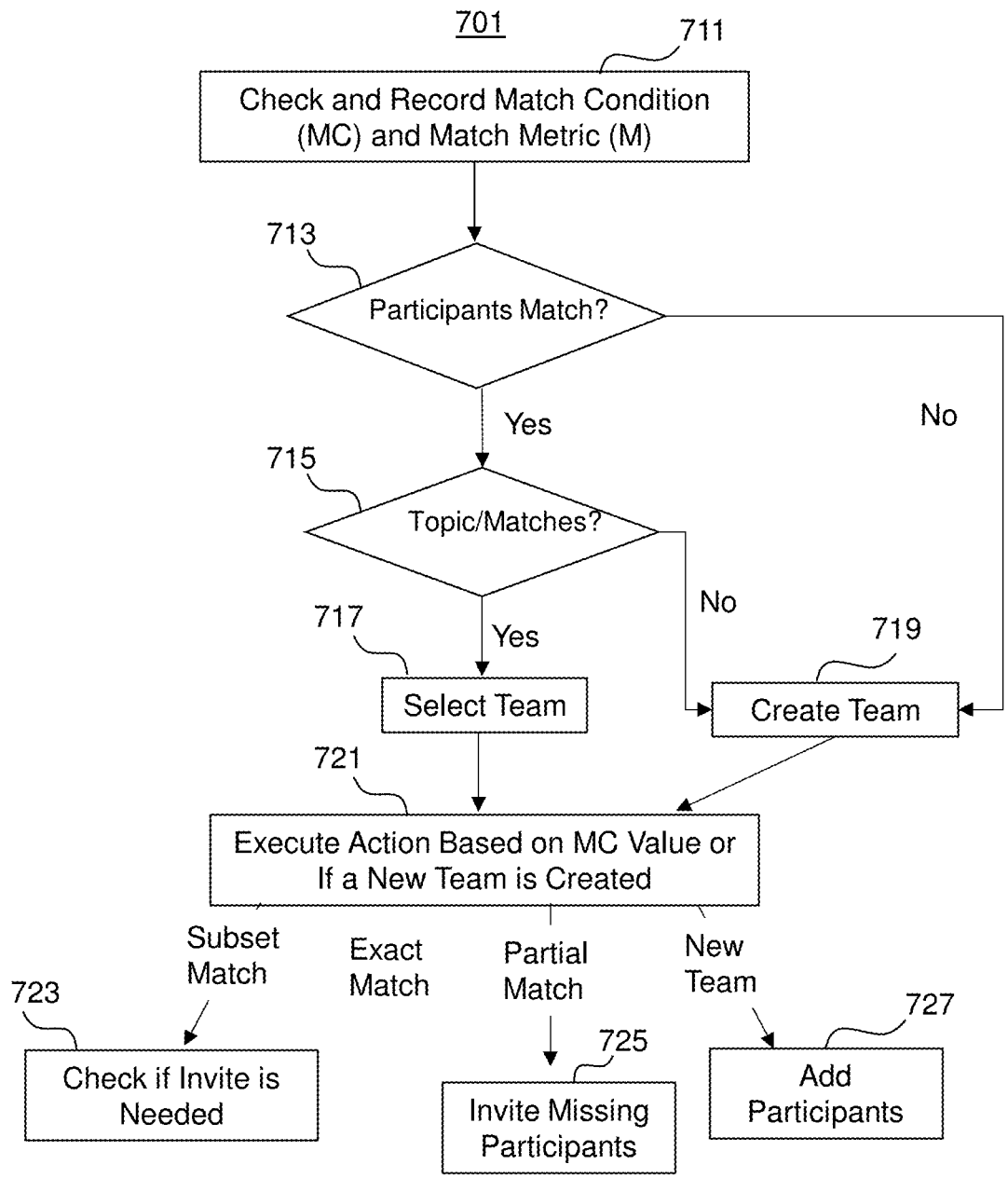
FIG. 7 is a flowchart of an example process of selecting a team and inviting prospective meeting attendees to the team, consistent with disclosed embodiments.

FIG. 7 is a flowchart of an example process 701 for selecting a team or creating a team for a meeting (e.g., meeting 180). In an example embodiment, process 701 is performed by analysis module 212. At step 711, analysis module 212 is configured to check and record a match condition and a match metric, as previously described in relation to FIG. 4, table 401, column 3 for various teams 311. At step 713, analysis module 212 determines whether prospective meeting attendees 110 match at least some members of one or more teams 311. For example, if the match condition evaluates to "Exact Match," "Subset Match," or "Partial Match," for a proposed matching team, module 212 determines that the match is found (step 713, Yes). Otherwise, module 212 determines that the match is not found (step 713, No). If a match is found (step 713, Yes), process 701 proceeds to step 715. Alternatively, if the match is not found (step 713, No), module 212 is configured to create a new matching team for meeting 180 at step 719.

At step 715, analysis module 212 determines whether a topic of meeting 180 matches a discussion topic of the proposed matching team (as determined in step 713). As described above, the topic of meeting 180 and the topic of the proposed matching team may be determined based on contextual information obtained from related communications for meeting 180 and the proposed matching team. If those topics match (step 715, Yes), the proposed matching team is selected to be the matching team at step 717. Alternatively, if the topics do not match (step 715, No), process 701 proceeds to step 719, and a new matching team is created.

After completion of step 717 or step 719, process 701 proceeds to step 721 and executes an action based on a value of the match condition established at step 711. For example, when the match condition for the matching team evaluates to "Subset Match," module 212 is configured to check, at step 723, if some of the team members of the proposed matching team associated with a meeting (e.g., meeting 180) need to be invited to meeting 180 when these team members are not prospective meeting attendees 110 of meeting 180. When the match condition evaluates to "Partial Match," module 212 is configured to check, at step 725, if some of prospective meeting attendees 110 need to be invited to join the proposed matching team associated with meeting 180. When the match condition evaluates to "Exact Match," no action needs to be taken. When step 719 was taken prior to step 721, module 212 is configured to add prospective meeting attendees as new members of the new matching team.

In addition to approaches discussed above for determining a matching metric for different teams 311, an approach utilizing machine learning may also be used. For example, the machine learning approach may receive email data and team data (as previously described) and output a match metric for each relevant team of team system 106. In some cases, the machine learning approach may output a probability that a particular team from team system 106 should be selected.

Figure 8:
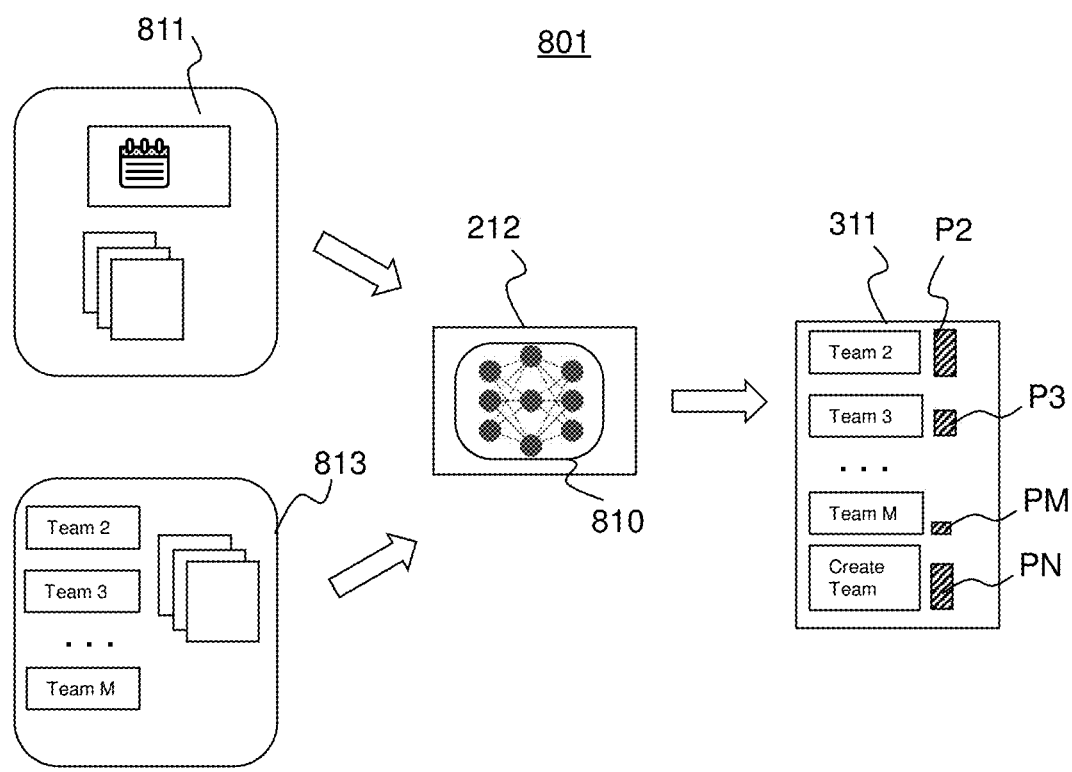
FIG. 8 shows the use of a machine-learning approach for determining a team, consistent with disclosed embodiments.

FIG. 8 shows the use of a machine-learning approach for determining a team, consistent with disclosed embodiments. For example, FIG. 8 shows an example of analysis module 212 that includes a machine learning algorithm 810. In an example embodiment, algorithm 810 takes as an input email data 811 and team data 813 and outputs a table listing probabilities P2, P3, . . . PM for selecting respective teams T2, T3, . . . TM. In an example embodiment, a probability PN is calculated, describing whether a new team needs to be created.

Machine learning algorithm 810 is trained using, as an input, email data 811, including meeting data 214, as well as team data 813. The output training data may be teams that are known to match email data 811 and team data 813. Various machine learning algorithms may be used, including a logistic regression model, a linear regression model, a regression model, a random forest model, a decision tree, artificial neural networks (such as deep neural networks), or any other form of machine learning model or algorithm. Some non-limiting examples of artificial neural networks include shallow artificial neural networks, deep artificial neural networks, feedback artificial neural networks, feedforward artificial neural networks, autoencoder artificial neural networks, probabilistic artificial neural networks, time delay artificial neural networks, convolutional artificial neural networks, recurrent artificial neural networks, long short-term memory artificial neural networks, and so forth.

In some cases, a match metric for more than one team may be sufficiently high to warrant choosing those teams as matching teams for a meeting (e.g., meeting 180). In an example embodiment, analysis module 212 is configured to select those matching teams, create a new team, and populate team data of the new team (e.g., chat feed, audio, video, and image data) with data obtained from the matching teams.

Figure 9A:
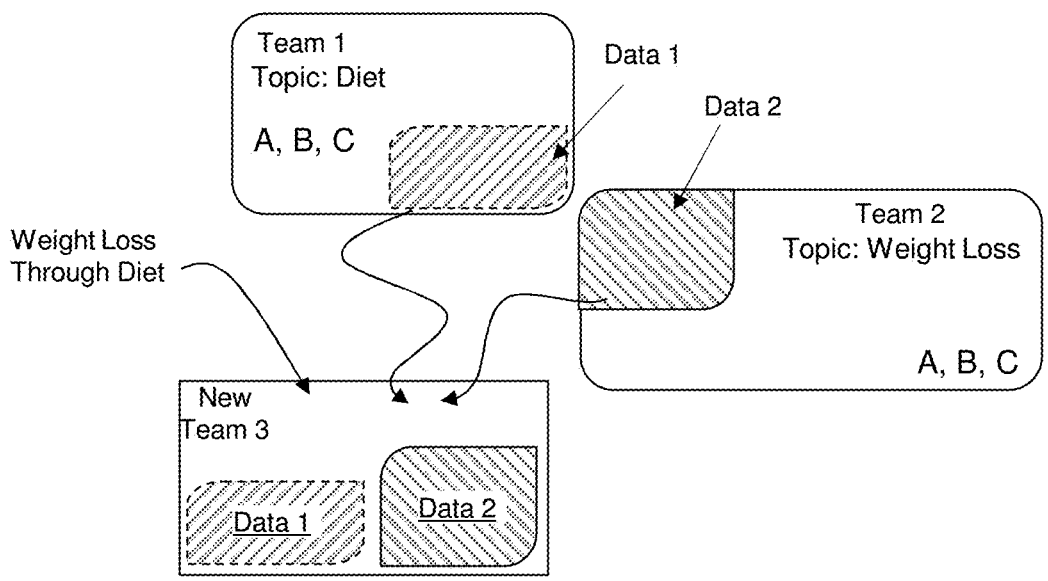
FIGS. 9A and 9B show example approaches for creating a new team, consistent with disclosed embodiments.

FIG. 9A shows an example approach for creating a new team, consistent with disclosed embodiments. In an example embodiment, matching teams include Team 1 and Team 2 with the same members A, B, and C, and respective topics Diet and Weight Loss. If meeting 180 is about a topic of losing weight through diet, data in Team 1 and Team 2 that addresses these topics (e.g., data 1 and data 2 that address both topics of diet and weight loss) is selected and used for populating data of a new Team 3. In an example embodiment, data 1 and data 2 are determined to be "overlap data," which is the data that can be classified by a suitable classifier (e.g., a classifier based on a machine-learning algorithm) to possibly belong to both Team 1 and Team 2 (a suitable classifier may analyze team data for both Team 1 and Team 2, and determine that data 1 and data 2 may be a good fit for both Team 1 and Team 2). It should be appreciated that any suitable data and not just "overlap data," such as data 1 and data 2 may be selected to populate a new team, based on analysis of data of Team 1 and Team 2. In an example embodiment, both a request for creating a new team and determining data for populating the new team is performed by analysis module 212.

Figure 9B:
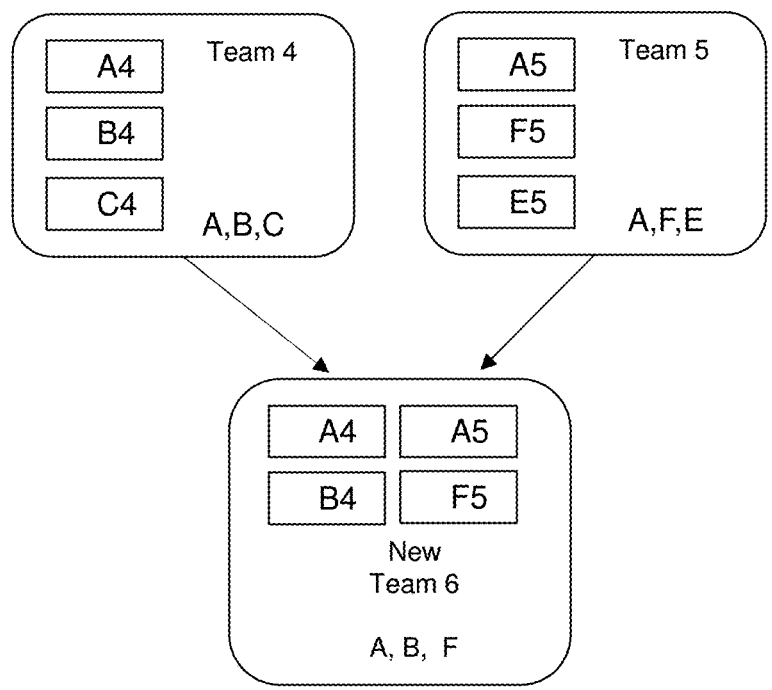

FIG. 9B shows another example approach for creating a new team. More particularly, FIG. 9B shows an example of how a new Team 6 is populated by data from teams Team 5 and Team 6. In an example embodiment, meeting 180 is scheduled for prospective meeting attendees A, B, F, and analysis module 212 selects Team 4 and Team 5 as the matching teams for meeting 180. As shown in FIG. 9B, Team 4 has members A, B, and C, and members of Team 5 has members A, F, and E. In an example embodiment, members A, B, and C of Team 4 may send/receive respective communication data (e.g., text messages, chat feeds, and the like) A4, B4, and C4. Similarly, members A, F, and E of Team 5 may send/receive respective communication data A5, F5, and E5. Analysis module 212 is configured to select communication data A4 and B4 from Team 4 and communication data A5 and F5 from Team 5, and use that data to populate team data for new Team 6, as indicated in FIG. 9B. In an example embodiment, analysis module 212 may not select communication data C4 and E5 since these communication data are not related to prospective meeting attendees A, B, and F.

Figure 10:
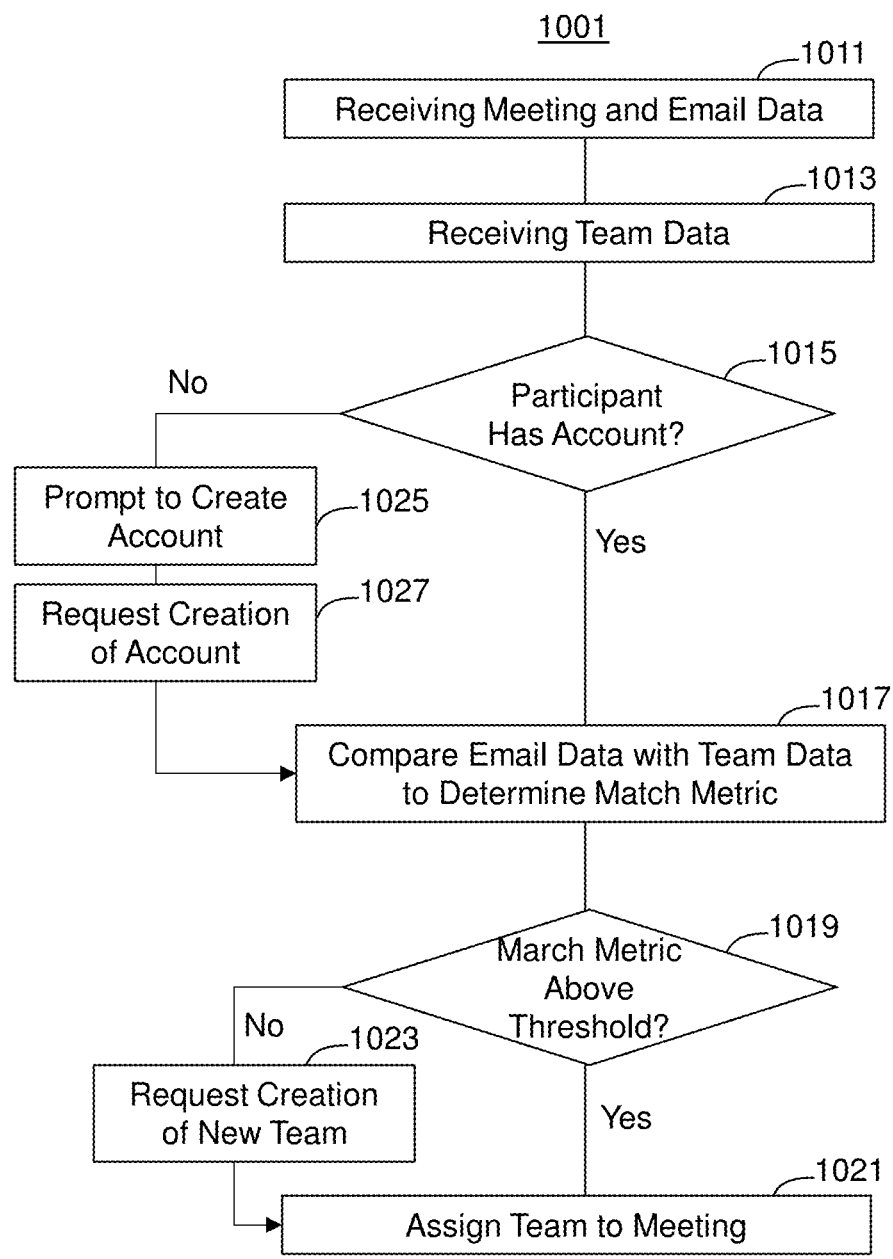
FIGS. 10-12 are flowcharts of example processes for selecting a team for a meeting, consistent with disclosed embodiments.
Figure 11:
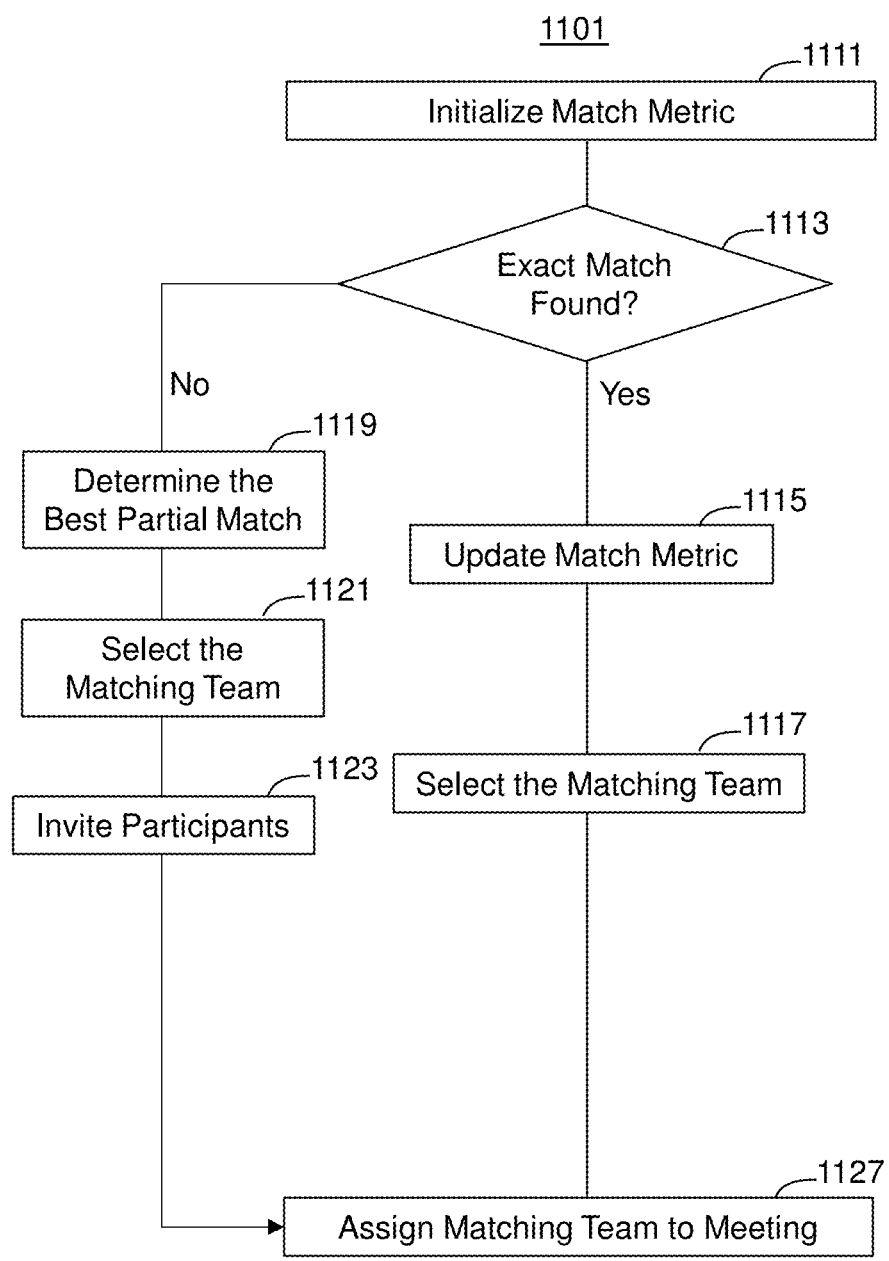
Figure 12:
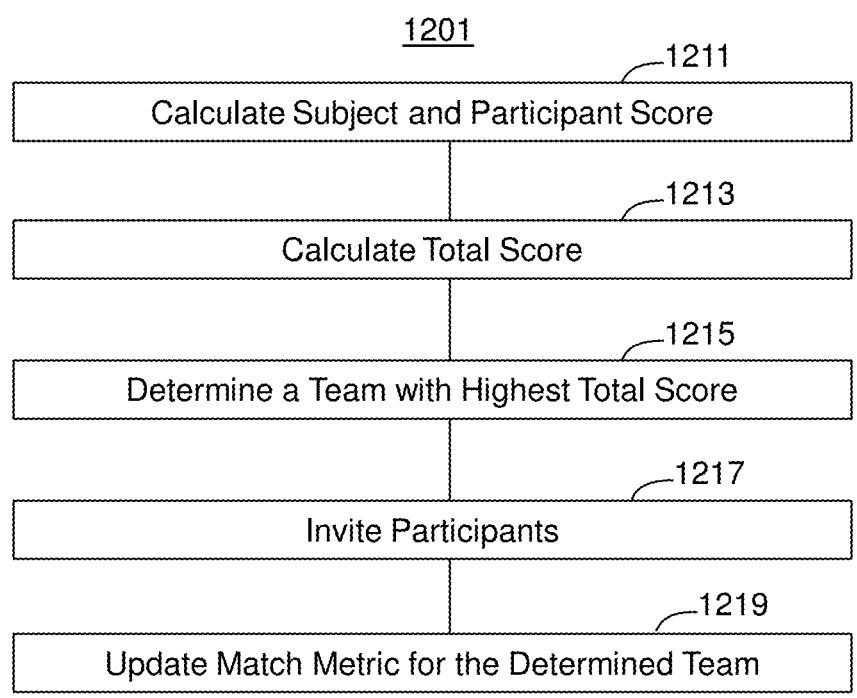

FIGS. 10-12 are flowcharts respectively showing example processes 1001, 1101, and 1201 for selecting a team for a meeting, consistent with disclosed embodiments. Steps of processes 1001, 1101, and 1201 may be performed by analysis module 212. With reference to FIG. 10 and example process 1001, at step 1011, analysis module 212 receives email data (e.g., data 811, shown in FIG. 8, also referred to as first information, as described above). Email data 811 includes meeting data 214 for a meeting (e.g., meeting 180) as well as a list of prospective meeting attendees. At step 1013, analysis module 212 receives team data (e.g., data 813, also referred to as second information, as described before). In an example embodiment, team data 813 includes a list of members for each one of the plurality of teams. At step 1015, module 212 determines if all prospective meeting attendees from the list of prospective meeting attendees have an account with team system 106. If that is the case (step 1015, Yes), module 212 proceeds to step 1017 and compares email data 811 and team data 813 to determine a match metric for each one of the plurality of teams (e.g., teams 311, shown in FIG. 3A). Alternatively, if at least some of the prospective meeting attendees from the list of prospective meeting attendees do not have a corresponding account with team system 106, those prospective meeting attendees are prompted to create a corresponding account at step 1025. At step 1027, module 212 requests system 106 to create the corresponding accounts and subsequently proceeds to step 1017, as shown in FIG. 10. After completion of step 1017, at step 1019, module 212 determines whether the match metric is above a threshold value, and if such is the case (step 1019, Yes), assigns the matching team to meeting 180 at step 1021. In an example embodiment, associating the matching team with meeting 180 includes providing a link to the matching team for the prospective meeting attendees of meeting 180. If the match metric is below the threshold value (step 1019, No), module 212 submits a request to team system 106 to create a new account at step 1023, and after the creation of the account, assign the new team to meeting 180 at step 1021.

With reference to FIG. 11, an example process 1101 includes steps for determining the match metric when an exact and/or partial match is found and associating the matching team with meeting 180. At least some steps of process 1101 may be sub-steps of process 1001. At step 1111, module 212 initializes a match metric to a value that is less than a target threshold value, and at step 1113, module 212 finds the first team from a plurality of teams of system 106 for which every one of the account-holding prospective meeting attendees is also a member of the first team (e.g., module 212 determines if the exact match is found, as previously described). If the exact match is found (step 1113, Yes), module 212 is configured to update the match metric at step 1115. Updating the match metric includes setting the match metric to a value that is greater than the target threshold value. After completion of step 1115, module 212 selects the matching team (e.g., the first team corresponding to the exact match) at step 1117, and at step 1127, assigns the team to meeting 180. Step 1127 may be the same as step 1021 of process 1001. If the exact match is not found (step 1113, No), module 212 is configured to determine the best partial match at step 1119. In an example embodiment, finding the best partial match includes finding a second team of the plurality of teams for which the largest number of the account-holding prospective meeting attendees are also members of the second team. At step 1121, module 212 is configured to select the matching team (e.g., the second team corresponding to the best partial match). At step 1123, if there are prospective meeting attendees who are not members of the second team, module 212 is configured to request email system 105 to invite these prospective meeting attendees to join the second team of team system 106. After completion of step 1123, module 212 proceeds to step 1127.

With reference to FIG. 12, an example process 1201 includes steps for determining the match metric using subject and attendee scores, as previously described. At step 1211, module 212 is configured to calculate, for each team of the plurality of teams, a subject score TS and an attendee score AS. In an example embodiment, calculating the subject score includes determining a likelihood that the subject of each team matches the information about the topic for the meeting. A process of calculating the attendee score includes determining a percentage of the account-holding prospective meeting attendees that are also members of each team. Further details of calculating the subject score TS and attendee score AS are described above in relation to FIGS. 3A and 3B.

At step 1213, a total score is calculated as a weighted average of the corresponding subject score and the attendee score, as previously described, and at step 1215, a proposed matching team with the highest total score is identified. At step 1217, if there are prospective meeting attendees who are not members of the proposed matching team, module 212 is configured to request email system 105 to invite these prospective meeting attendees to join the proposed matching team of team system 106. After completion of step 1217, at step 1219, module 212 updates the match metric for the proposed matching team to a value greater than a target threshold value, so that the proposed matching team will be selected as the matching team for meeting 180.

Embodiments of the present disclosure may be implemented through any suitable combination of hardware, software, and/or firmware. Systems and components of the present disclosure may be implemented with programmable instructions implemented by a hardware processor. In some embodiments, a non-transitory computer-readable storage medium, including instructions is also provided, and the instructions may be executed by a processor device for performing the above-described steps and methods. Common forms of non-transitory media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, an EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

Systems 105, 106, and data link module 140 (herein, for brevity, referred to as communication management systems (CMS)) may use various devices, such as processors, memory devices, and may be connected to various client devices. Example client devices may include one or more computing devices configured to perform one or more operations consistent with disclosed embodiments. For example, client devices may include a desktop computer, a laptop, a server, a mobile device (e.g., tablet, smartphone, etc.), a set-top box, a gaming device, a wearable computing device, or another type of computing device. The client devices may include one or more processors configured to execute software instructions stored in memory, such as memory included in client devices, to perform various operations. The client devices may be configured for wired and/or wireless communications and may include software that, when executed by a processor, performs internet-related communication (e.g., TCP/IP) and content display processes. For instance, client devices may execute browser software that generates and displays interfaces, including content on a display device included in, or connected to, client devices. The client devices may execute software applications that allow client devices to communicate with components of systems 105, 106, and module 140, and generate and display content in interfaces via display devices included in client devices.

The disclosed embodiments are not limited to any particular configuration of client devices. In certain embodiments, client devices may be configured to execute software instructions relating to location services, such as GPS locations. For example, client devices may be configured to determine a geographic location and provide location data and time stamp data corresponding to the location data to the calendar of system 105 and/or system 106.

The CMS may include one or more computing systems that perform operations to store and provide data (e.g., email data, team data, and the like). The CMS may include one or more databases that include user profiles and any data (e.g., historical communication data), including data associated with previously conducted meetings. The CMS may also include processors that may include multiple core processors to handle concurrently multiple operations and/or streams. For example, the CMS may include parallel processing units to concurrently handle information obtained from multiple client devices.

One or more databases of the CMS may include one or more computing devices configured with appropriate software to perform operations for providing information to and from system 100. An example database may include, for example, Oracle™ database, Sybase™ database, or other relational databases or non-relational databases, such as Hadoop™ sequence files, HBase™, or Cassandra™. In an illustrative embodiment, a database may include computing components (e.g., database management system, database server, etc.) configured to receive and process requests for data stored in memory devices of the database and to provide data from the database.

The CMS may include a network system, including any type of connection between various computing components. For example, the network system may facilitate the exchange of information via network connections that may include Internet connections, Local Area Network connections, near field communication (NFC), or other suitable connection(s) that enables the sending and receiving of information between the components of the CMS. In some embodiments, one or more components of the CMS may communicate directly through a dedicated communication link(s).

It should be noted that the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open-ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a system may include A or B, then, unless specifically stated otherwise or infeasible, the system may include A, or B, or A and B. As a second example, if it is stated that a system may include A, B, or C, then, unless specifically stated otherwise or infeasible, the system may include A, or B, or C, or A and B, or A and C, or B and C, or A and B and C.

It is appreciated that the above-described embodiments can be implemented by hardware, or software (program codes), or a combination of hardware and software. If implemented by software, it may be stored in the above-described computer-readable media. The software, when executed by the processor, can perform the disclosed methods. The computing units and other functional units described in this disclosure can be implemented by hardware, or software, or a combination of hardware and software.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

The foregoing description has been presented for purposes of illustration. It is not exhaustive and is not limited to precise forms or embodiments disclosed. Modifications and adaptations of the embodiments will be apparent from a consideration of the specification and practice of the disclosed embodiments. For example, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from a consideration of the specification and practice of the embodiments disclosed herein. It is intended that the specification and examples be considered as an example only, with a true scope and spirit of the disclosed embodiments being indicated by the following claims.

What is claimed is:

1. A method for associating a team with a meeting for prospective meeting attendees, the method comprising:

training, by a processor, a machine-learning algorithm to determine a match metric between a group of meeting attendees and a particular team, wherein the machine-learning algorithm training uses known information about a plurality of teams and a plurality of meetings, and the match metric is indicative of a number of members of the particular team that are identical to the group of meeting attendees and a probability that a subject of the particular team matches a topic of the meeting;

receiving, by the processor from an electronic communication system, a meeting invitation comprising first information, wherein the first information comprises data identifying the prospective meeting attendees;

receiving, by the processor from a team system, second information for a plurality of existing teams in the team system, wherein the second information comprises data identifying members for each one of the plurality of existing teams;

after receiving the meeting invitation and the second information, determining, by the processor using the trained machine-learning algorithm and based on the first information and the second information, a match metric for each one of the plurality of existing teams in the team system, the match metric for each existing team being indicative of a number of members of the existing team that are identical to the prospective meeting attendees and a probability that a subject of the existing team matches a topic of the meeting;

in response to determining that a match metric of an existing team is above a match threshold value, determining, by the processor, that the existing team is a matching team for the meeting;

in response to determining that the match metric computed for each one of the plurality of existing teams is below the match threshold value, creating, by the processor, a new team;

associating, by the processor, the matching team or the new team with the meeting for the prospective meeting attendees; and sending, to the prospective meeting attendees, a link to the matching team or the new team.

2. The method of claim 1, further comprising:
determining that an attendee from the prospective meeting attendees does not have an account with the team system; and
in response to determining that the attendee does not have an account, prompting the attendee to create the account.

3. The method of claim 2, wherein the team system comprises an interface for the members of the matching team to communicate via text, data files, audio, or video.

4. The method of claim 1, wherein the first information further comprises information about a topic for the meeting and the second information further comprises a plurality of subjects, each one of the plurality of subjects corresponding to each one of the plurality of existing teams.

5. The method of claim 4, wherein the meeting invitation is an electronic communication transmitted via the electronic communication system for transmitting and storing electronic communications.

6. The method of claim 5, wherein the first information further comprises a plurality of electronic communications stored by the electronic communication system, each one of the plurality of electronic communications transmitted between a group of prospective meeting attendees from the prospective meeting attendees, and wherein the second information further comprises a plurality of communications transmitted between a group of the members for each one of the plurality of existing teams.

7. The method of claim 6, further comprising inviting a member of the matching team to the meeting when the member is not identified as one of the prospective meeting attendees.

8. The method of claim 7, wherein a decision for inviting the member is determined by a certification board.

9. The method of claim 6, wherein the match metric is based on:
   the data identifying the prospective meeting attendees;
   the data identifying the members for each one of the plurality of existing teams;
   the information about the topic for the meeting; and
   the plurality of subjects corresponding to the plurality of existing teams.

10. The method of claim 9, wherein the machine-learning algorithm is trained on previous first and second information, previous meeting invitations, and previous determinations of matching teams.

11. The method of claim 9, wherein the match metric is further based on topics of each one of the plurality of electronic communications.

12. The method of claim 11, wherein the topics of each one of the plurality of electronic communications are determined using a natural language processing algorithm.

13. The method of claim 12, further comprising:
    determining the plurality of subjects; and
    for an electronic communication from the plurality of electronic communications, determining a probability that a subject from the plurality of subjects is also a topic of the electronic communication.

14. The method of claim 13, wherein the subjects for each one of the plurality of existing teams are determined by analyzing team-related data, wherein the team-related data includes at least one of text data, audio data, or video data.

15. The method of claim 14, wherein the match metric is further based on a date and time of each one of the plurality of electronic communications.

16. The method of claim 1, wherein computing the match metric comprises:
    initializing the match metric to a value below the match threshold value;
    identifying a first team of the plurality of existing teams for which each of the prospective meeting attendees is a member;
    in response to identifying the first team:
    assigning the first team to be the matching team; and
    assigning the match metric a first value above the match threshold value.

17. The method of claim 16, wherein in response to not identifying a first team for which each of the prospective meeting attendees is a member:
    finding a second team of the plurality of existing teams, wherein a number of the members of the second team that are identical to the prospective meeting attendees is the greatest among the plurality of existing teams;
    requesting an approval from a certification board for other prospective meeting attendees that are not members of the second team to become new members of the second team;
    in response to receiving the approval:
    requesting a team system to add the other prospective meeting attendees to a membership of the second team;
    assigning the second team to be the matching team; and assigning the match metric a second value above the match threshold value.

18. The method of claim 1, wherein computing the match metric comprises:
    calculating, for each team of the plurality of existing teams, a subject score and an attendee score, wherein calculating the subject score comprises determining a likelihood that a subject of each team matches information about a subject for the meeting, and wherein calculating the attendee score comprises determining a percentage of the prospective meeting attendees that are also members of each team;
    calculating, for each team of the plurality of existing teams, a total score being a weighted average of the corresponding subject score and the attendee score;
    determining a team for which the total score is highest;
    assigning the determined team to be the matching team;
    requesting at least one prospective meeting attendee that is not a member of the matching team to become a new member of the matching team;
    in response to receiving the approval from the at least one prospective meeting attendee to become the new member of the matching team:
    requesting to add the at least one prospective meeting attendee to a membership of the matching team; and
    assigning the match metric a value above the match threshold value.

19. The method of claim 1, wherein the associating comprises providing the prospective meeting attendees with a link to an interface for one of the matching team or the new team.

20. A non-transitory computer readable medium having a browser plugin thereon for transmitting data between a team system and an electronic communication system, the browser plugin comprising instructions, such that when executed by a processor result in the processor performing operations comprising:
    training a machine-learning algorithm to determine a match metric between a group of meeting attendees and a particular team, wherein the machine-learning algorithm training uses known information about a plurality of teams and a plurality of meetings, and the match metric is indicative of a number of members of the particular team that are identical to the group of meeting attendees, and a probability that a subject of the particular team matches a topic of the meeting;
    receiving, from the electronic communication system, a meeting invitation comprising first information, wherein the first information comprises data identifying the prospective meeting attendees;
    receiving, from the team system, second information for a plurality of existing teams in the team system, wherein the second information comprises data identifying members for each one of the plurality of existing teams;
    after receiving the meeting invitation and the second information, determining, by using the trained machine-learning algorithm and based on the first information and the second information, a match metric for each one of the plurality of existing teams in the team system, the match metric for each existing team being indicative of a number of members of the existing team that are identical to the prospective meeting attendees and a probability that a subject of the existing team matches a topic of the meeting;

in response to determining that a match metric of an existing team is above a match threshold value, determining that the existing team is a matching team for the meeting;

in response to determining that the match metric computed for each one of the plurality of existing teams is below the match threshold value, creating a new team;

associating the matching team or the new team with the meeting for the prospective meeting attendees; and sending, to the prospective meeting attendees, a link to the matching team or the new team.

21. The non-transitory computer readable medium of claim 20, wherein the team system comprises a service with a web interface, and wherein the electronic communication system comprises an email server.

* * * * *